United States Patent [19]
Shiotani et al.

[11] Patent Number: 5,257,570
[45] Date of Patent: Nov. 2, 1993

[54] CIRCULAR SAW UNIT

[75] Inventors: Takeshi Shiotani; Kouichi Miyamoto; Norifumi Nakamura, all of Tokyo, Japan

[73] Assignee: Ryobi Limited, Hiroshima, Japan

[21] Appl. No.: 2,675

[22] Filed: Jan. 11, 1993

Related U.S. Application Data

[63] Continuation of Ser. No. 729,444, Jul. 12, 1991, abandoned.

Foreign Application Priority Data

Jul. 16, 1990 [JP] Japan .................. 2-187492

[51] Int. Cl.$^5$ .................. B27B 5/20; B23D 45/04
[52] U.S. Cl. .................. 83/471.3; 83/473; 83/477.1; 83/490; 83/699
[58] Field of Search .................. 83/397, 471.3, 473, 83/477.1, 478, 490, 699

[56] References Cited

U.S. PATENT DOCUMENTS

| | | | |
|---|---|---|---|
| 1,841,996 | 1/1932 | Van Berkel | 83/490 |
| 4,335,637 | 6/1982 | Kaltenbach | 83/490 |
| 4,587,875 | 5/1986 | Deley | 83/471.3 |
| 4,869,142 | 9/1989 | Sato et al. | 83/490 |
| 5,020,406 | 6/1991 | Sasaki et al. | 83/490 |

Primary Examiner—Hien H. Phan
Attorney, Agent, or Firm—Oliff & Berridge

[57] ABSTRACT

A circular saw unit capable of changing an angle for cutting a workpiece comprises a base member, a rotary table which is rotatably mounted on the base member and on which the workpiece is placed, a hinge having one end supported to the rotary table and, a bracket member or support arm member pivotally connected to the other end of the hinge. The hinge comprises a lower hinge member having one end supported to the rotary table and an upper hinge member having one end pivotally connected to the other end of the lower hinge member and having the other end connected pivotally to the bracket member. The hinge may have a quadrilateral link mechanism for restricting a lower limit position of the circular saw and for assuring a horizontal movement of the circular saw during a cutting operation.

9 Claims, 28 Drawing Sheets

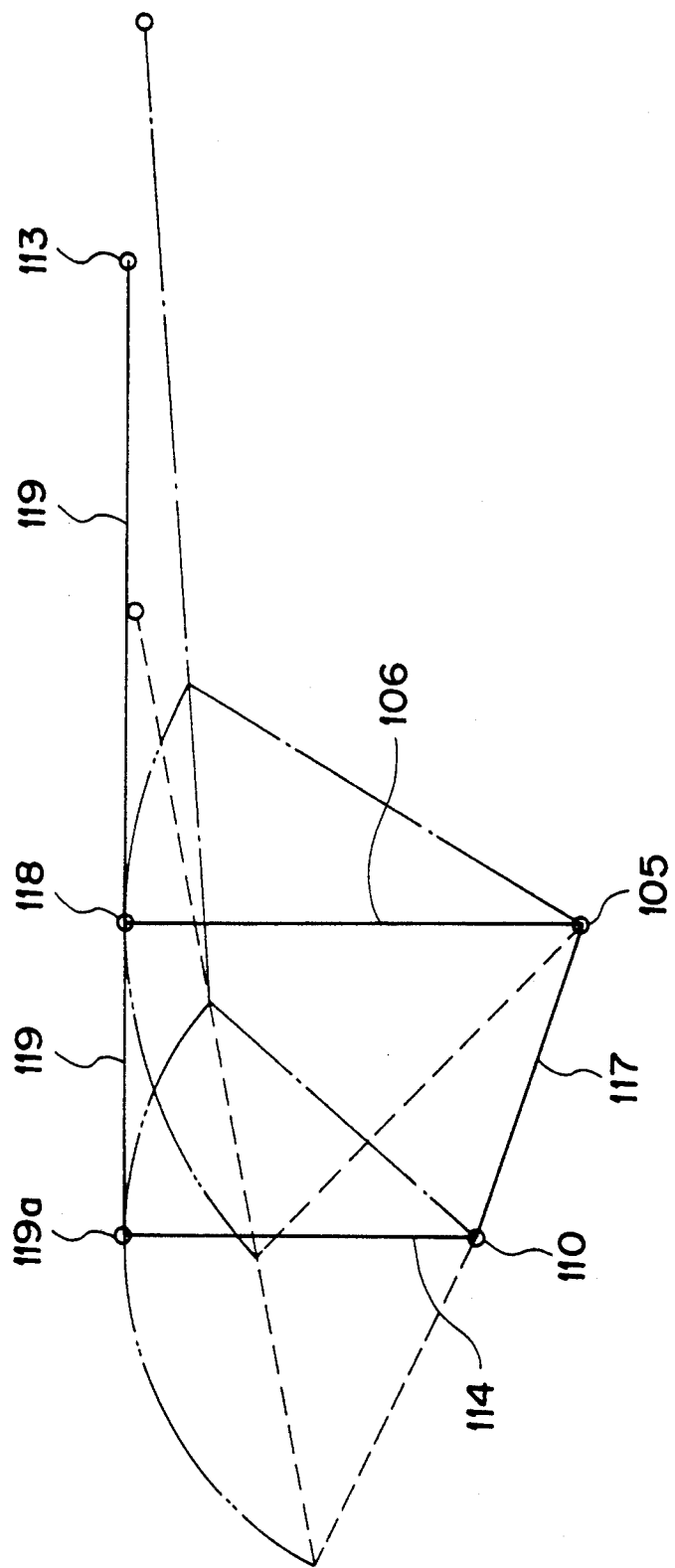
F I G. 13

CIRCULAR SAW UNIT

This is a continuation of application Ser. No. 07/729,444 filed Jul. 12, 1991, now abandoned.

BACKGROUND OF THE INVENTION

The present invention relates to a rotary circular saw unit, a so-called miter saw or compound miter saw, capable of changing a workpiece cutting angle in which a lowered position of the circular saw can be restricted.

A conventional compound miter saw capable of changing a cutting angle of the saw is shown in FIG. 29.

Referring to FIG. 29, the compound miter saw unit, includes a base 1 on which a workpiece W to be cut is placed. A fence 2 is mounted on the rear, left as viewed, portion of the upper surface of the base 1 and the fence 2 is provided with a center portion 2a and a vertical receiving surface 2b (FIG. 32) for supporting the rear surface of the workpiece W in abutment condition. A rotary table 3 is disposed at substantially the center portion of the base 1, and at a rear portion of the rotary table 3 is disposed a hinge member 4 having a lower portion 16 supported on the side face of the rotary table 3 and an upper portion 17 extending vertically. The hinge member 4 is pivotal in the lateral directions as viewed from the front side of the miter saw unit and is capable of being secured onto the side face of the turntable 3 with a desired angle.

At the upper end portion of the hinge member 4 is supported, in a pivotal manner, a bracket (a circular saw support arm) 7 supporting a main cover 14 and a safety cover 15. A circular saw driving unit 6 is fixed to the side face of the main cover 14 and includes a motor and a reduction gear. The bracket 7 is elevated to a non-cut position by the urging force of an elastic member 8 such as a coil spring. A circular saw 5 is lowered at the time of an actual cutting operation, while gripping the handle till the circular saw 5 enters a circular saw escape slit formed in the rotary table 3 and extending back and forth. At the thus lowered position of the saw 5, the workpiece W is cut by the circular saw 5.

In order to change a miter angle of the circular saw 5 and a bevel angle thereof, the compound miter saw unit of the construction described above has a structure capable of rotating the rotary table 3 in accordance with the miter angle and of pivoting the hinge member in a perpendicular plane (perpendicular to the paper surface) along the lateral direction of the saw unit in accordance with the bevel angle with the pin axis 16a being the center of the pivotal movement. Accordingly, in the compound miter saw unit, the circular saw 5 can be inclined with two degrees of freedom, thus being capable of cutting the workpiece obliquely with a desired angle.

However, the hinge member 4 cannot be swung in the front and rear direction of the unit (left and right direction as viewed in FIG. 29).

Therefore, a setting position of the workpiece W on the rotary table 3 must be changed in accordance with the size of the workpiece W.

FIG. 30 shows a case where a workpiece W1 having a rectangular cross section is cut and when the circular saw 5 is lowered to cut the same, the center of the circular saw 5 coincides with the center of the width direction of the workpiece W1. In this case, since the workpiece W1 has a proper width 11, any extra operations are not necessary. However, in a case where a workpiece W2 having a small width 12 as shown in FIGS. 29 and 31, two abutment pieces P must be disposed between the fence 2 and the workpiece W2 in order to make the center of the workpiece W2 in its width direction coincide with the center of the circular saw 5. The abutment pieces P must be selected in accordance with the width of a workpiece. Moreover, the abutment pieces must be disposed separately from each other in the lateral direction of the base to form a space C therebetween in which a part of the circular saw 5 is accommodated. Therefore, there may cause to scatter cutting chips into ambience during the cutting operation, thus being dangerous.

SUMMARY OF THE INVENTION

An object of the present invention is to substantially eliminate defects or drawbacks encountered in the prior art described above and to provide a circular saw unit in which workpieces having various sizes can be cut simply and safely.

Another object of the present invention is to provide a circular saw unit capable of easily and safely shifting the circular saw unit in a horizontal direction while restricting the lower limit position of the circular saw.

According to the present invention, there is provided a circular saw unit including a circular saw for cutting a workpiece, comprising: a base member; a rotary table which is rotatably mounted on the base member and on which the workpiece is placed; a hinge means having one end supported to the rotary table; and a bracket member pivotally connected to the other end of the hinge means to support a circular saw; said hinge means comprising a first hinge member having one end supported to the rotary table so as to be swung in the lateral direction of the base member and a second hinge member having one end pivotally connected to the other end of the first hinge member so as to be swung in the front and rear directions of the base member in a predetermined range of angle and having the other end connected pivotably to the bracket.

In a preferred embodiment, the upper hinge member is pivotally connected to an intermediate portion of the support arm member, and a quadrilateral link mechanism is an irregular quadrilateral link mechanism comprising a circular saw unit, wherein said quadrilateral link mechanism is an irregular quadrilateral link mechanism comprising said second hinge member, a stationary link having one end connected to said first and second hinge members, a part of said bracket member pivotally supported, at an intermediate portion thereof, by said second hinge member and a swing motion limiting link having one end pivotally connected to the other end of the stationary link and the other end slidably connected to a free end of said bracket member, said swing motion limiting link having a length shorter than that of said second hinge member.

Also in a preferred embodiment, the upper hinge member is pivotally connected to an end portion of the support arm member, and the quadrilateral link mechanism is an irregular quadrilateral link mechanism comprising the circular saw unit, wherein said second hinge member is pivotally connected to an end portion of said bracket member, said quadrilateral link mechanism being an irregular quadrilateral link mechanism comprising said second hinge member, a stationary link having one end connected to said first hinge member, a coupling link pivotally supported at one end of said second hinge member motion limiting link having one end pivotally connected to the other end of said stationary link and the other end pivotally connected to the other end of said coupling link, said swing motion limiting link having a length shorter than that of said bracket member. A stopper mechanism for limiting a vertical swing motion of the bracket with respect to the coupling link is further provided for between the coupling link and the bracket member. A coil spring is provided for said first hinge member so as to urge said second hinge member toward said turntable and a further coil spring is provided on said second hinge member so as to urge said bracket member upwardly.

In a further preferred embodiment, a circular saw unit further comprising an urging force adjusting member connected to the second hinge member, an auxiliary link having one end pivotally connected to said urging force adjusting member and the other end pivotally connected to said first hinge member and extending substantially in parallel to said second hinge member so as to constitute a parallel link mechanism and a spring member provided at a pivot portion between said bracket member and second hinge member in order to urge said bracket member upwardly, an urging force of the spring member being adjusted in accordance with swinging motion of said second hinge member.

In a still further preferred embodiment, said hinge member is provided with a guide member for restricting a lower limit position of said circular saw during a cutting operation.

Further objects, features and other aspects of this invention will be understood from the following detailed description of the preferred embodiments of this invention with reference to the drawings.

BRIEF DESCRIPTION OF THE DRAWINGS

In the accompanying drawings:

FIGS. 1 and 2 represent one embodiment of a circular saw unit of the present invention capable of changing a cutting angle applied to a compound miter saw apparatus, in which FIG. 1 is a left side view of a circular saw unit having an upper hinge member taking its front position and FIG. 2 is also a left side view of the circular saw unit having the upper hinge member taking its rear position;

FIG. 13 is an illustration of a mechanism for the explanatory of the horizontal movement of the circular saw according to the embodiment shown in FIG. 9;

DESCRIPTION OF THE PREFERRED EMBODIMENTS

Figure 1:
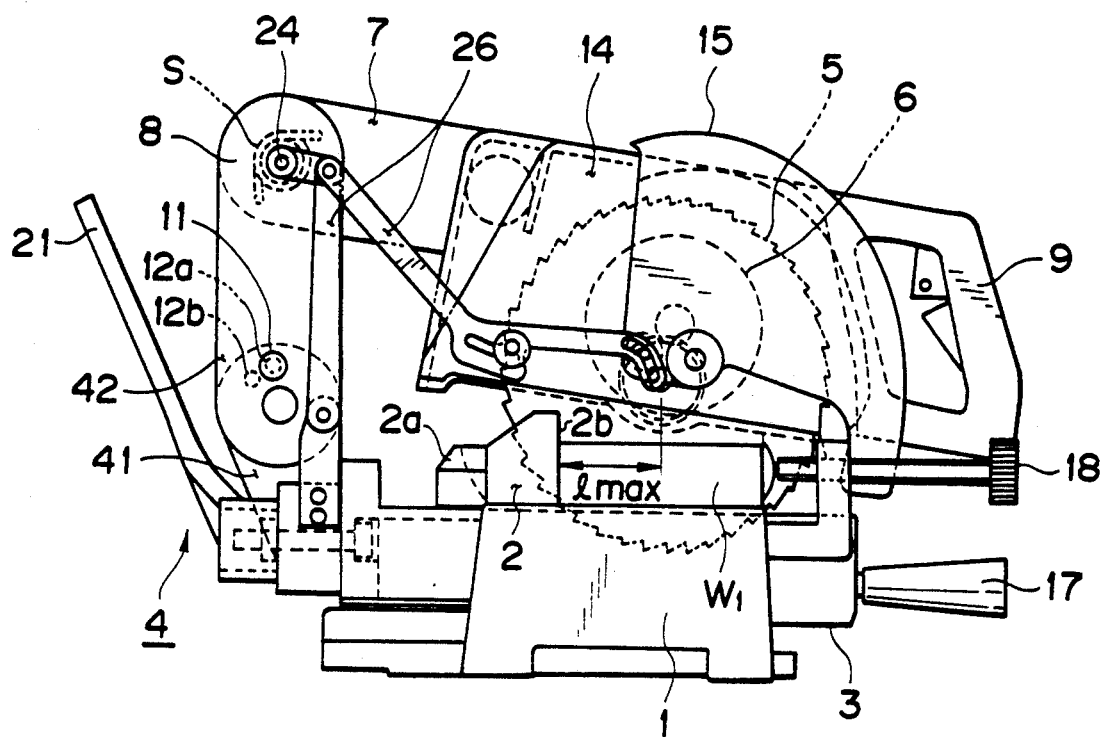
Figure 2:
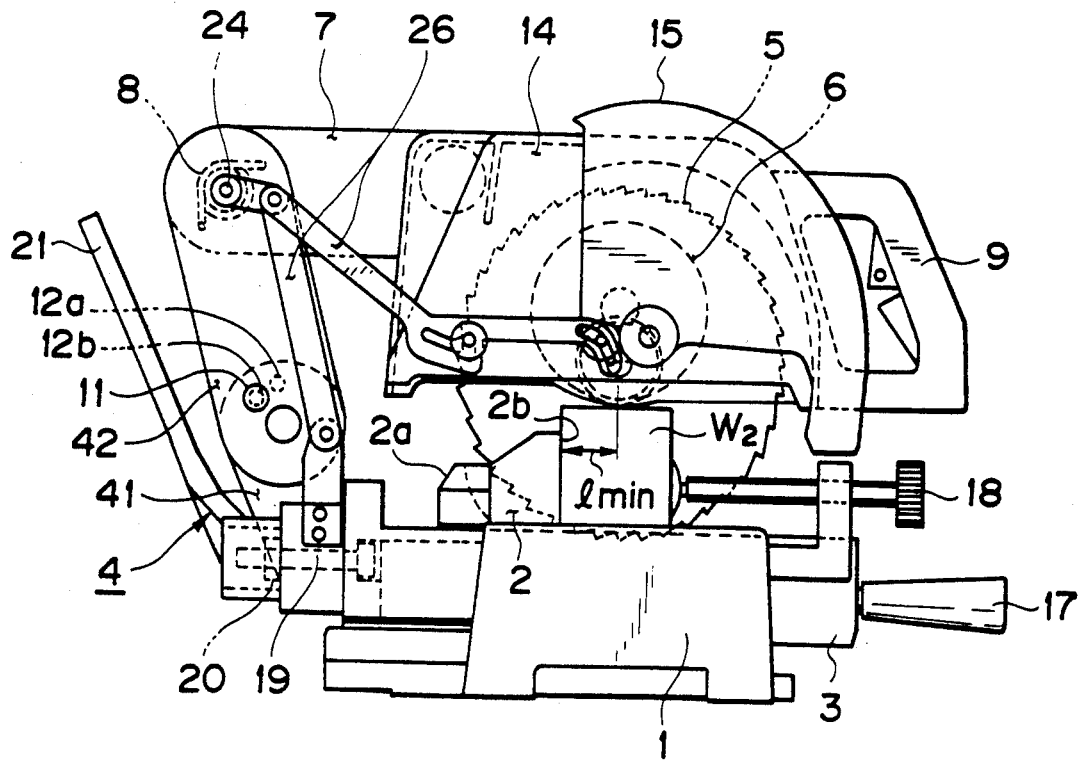

First, referring to FIGS. 1 and 2, a compound miter saw, to which a circular saw unit capable of changing a workpiece cutting angle according to the present invention is applicable, comprises a base 1 having a relatively large length along the lateral directions of the circular saw unit, a fence 2 attached to the left end portion of an upper surface of the base 1 and a screw clamp device 18 at a front portion of the base 1. A workpiece W1 is located on the base 1 in a state of contacting the fence 2, and the workpiece W1 can be clamped firmly by the screw clamp device 18.

The base 1 is provided with a recess at a central portion of the upper surface thereof and a rotary table 3 is disposed rotatably in the recess. The rotary table 3 has an upper surface positioned below the upper surface of the base 1 by about 2 or 3 mm so as not to interfer the workpiece W1 on the base 1. A screw hole is formed in the front side surface of the rotary table 3 so that a threaded portion of a lock handle 17 is screw-engaged with the screw hole. When the lock handle 17 is screwed inward, the threaded portion of the lock handle 17 is clamped against the cylindrical surface of the base 1 disposed inward of the table 3. Accordingly, the circular saw 5 is positioned with a desired miter angle within about 45°, respectively.

The fence 2 is provided with a circular saw bypass portion 2a (FIG. 6) formed at the central portion thereof so as to have a recessed inner wall and both the sides of the bypass portion 2a extend in the lateral directions of the base 1 so that the front surfaces of the extensions form the vertical receiving surfaces 2b for an abutting engagement with the rear surface of the workpiece W1.

A hinge means 4 disposed at the rear portion of the rotary table 3 is composed of a lower hinge member 41 and an upper hinge member 42 which supports the rear end of a bracket 7, as a circular saw support arm, in a pivotal manner. The upper end of the upper hinge member 42 and the rear end of the bracket 7 are connected pivotably to each other through a pivot pin 24 to form a second hinge and the bracket 7 is urged upward by a spring 8 disposed at the second hinge. To the bracket 7 is secured a circular saw driving mechanism 6 including a reduction mechanism and a driving motor for supporting the circular saw 5 and driving the same. A handle 9 is also secured to the front end of the bracket 7. A main cover 14 for covering the upper half of the circular saw 5 therewith is further secured to the bracket 7. The main cover 14 is further provided with a safety cover 15 which is rotated so as to overlap with the outside of the main cover 14 by the actuation of a link mechanism 26 when the circular saw 5 is lowered.

The lower hinge member 41 has a lower end pivotally secured to the rear portion of the rotary table 3 by a bolt 19 and a nut 20. The fastening of the bolt and nut assembly is loosened by rotating, in one direction, a fastening lever 21 fitted to the nut 20, thereby setting the inclination of the circular saw 5 at a desired angle, and the fastening lever 21 is then fastened.

Figure 3:
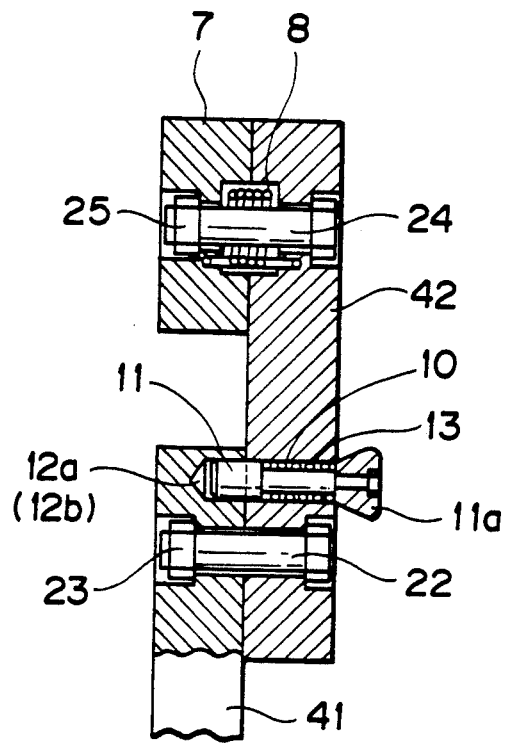
FIG. 3 is a longitudinally sectional view of a hinge portion of the circular saw unit of FIG. 1.

The lower hinge member 41 and the upper hinge member 42 are pivotably connected by a bolt 22 and a nut 23 to form a first hinge, as shown in FIG. 3. The upper hinge member 42 is rotated so as to occupy two predetermined front and rear positions. A hinge fastening pin 11 is fitted into a pin receiving hole 10, and a first fitting hole 12a is formed in the lower hinge member 41 so as to register with the pin 11 when the upper hinge member 42 takes the front position (FIG. 1). The hinge fastening pin 11 registers with a second fitting hole 12b when the upper hinge member 42 takes the rear position. A lock spring 13 is accommodated in the pin receiving hole 10. When the upper hinge member 42 is swung to change its position, the distal end of the hinge fastening pin 11 is removed from the first or second pin fitting hole 12a or 12b by pulling outward a knob 11a of the fastening pin 11, and the upper hinge member 42 is then rotated to the front or rear position. When the pin 11 is moved to each position, the pin 11 is automatically inserted into each hole 12a, 12b.

Figure 4:
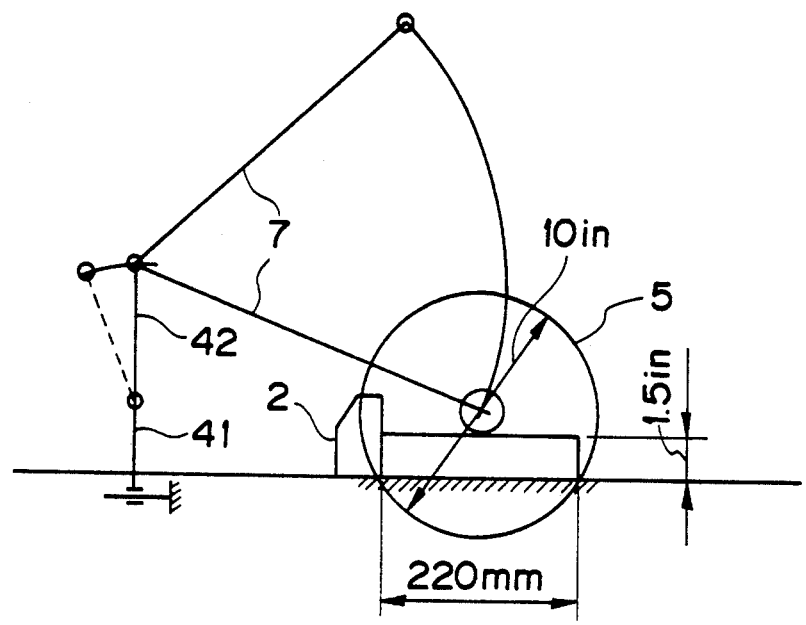
FIGS. 4 and 5 are illustrations showing cutting conditions of the circular saw in cases of the upper hinge member being at the front and rear positions, respectively.

As shown in FIG. 1, in a case where the upper end of the upper hinge member 42 takes its front position and the upper and lower hinge members 42 and 41 are firmly connected in the engagement of the hinge fastening pin 11 with the first pin fitting hole 12a, the circular saw 5 with a miter angle of 0° is lowered apart from the fence 2 with a predetermined large distance (lmax) between the fence 2 and the center of the circular saw, so that the center of the circular saw 5 is substantially coincident with the center of the width of the workpiece W1, placed on the base 1, having a predetermined small thickness and a predetermined maximum width. In the concrete, in the disclosure of this embodiment, as shown in FIG. 4, in the case of a circular saw having a diameter of 10 inches, it is expected that a workpiece W1 having a vertical sectional dimension of 1.5 inches and the width of 220 mm is cut. In this dimensional relationship, when the upper hinge member 42 takes its front position so that the circular saw 5 can vertically cut the workpiece W1, the circular saw 5 is preset so as to be lowered with the center thereof being apart from the fence 2 by a distance 110 mm. According to such setting, the circular saw 5 has a cutting ability of vertically cutting a workpiece having a cross sectional length of two-by-eight (1.5 inches×7.5 inches), and moreover, of vertically cutting a workpiece having a longitudinal sectional length of two-by-four (1.5 inches×3.5 inches) and of two-by-six (1.5 inches×5.5 inches), all with a miter angle of about 0° to 45°.

Figure 5:
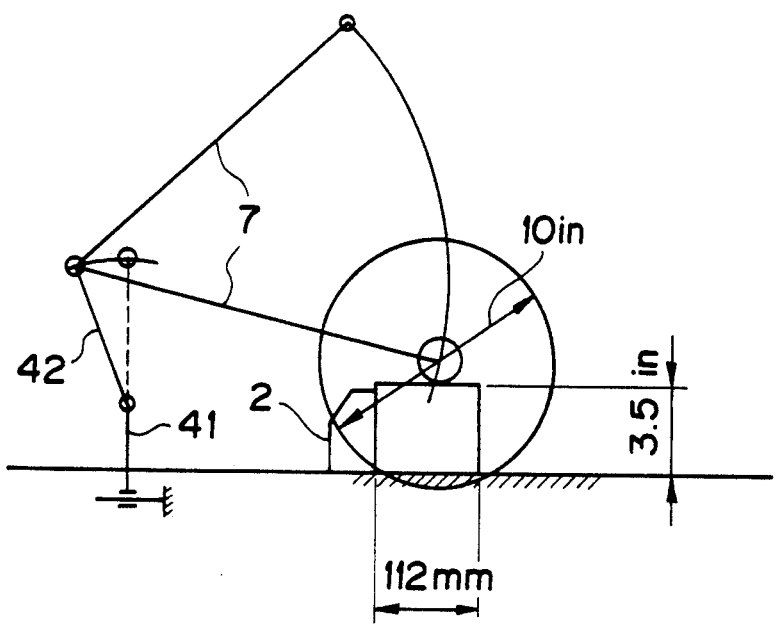

On the other hand, as shown in FIG. 2, in a case where the upper hinge member 42 takes its rear position, the upper and lower hinge members are firmly connected with each other with the hinge fastening pin 11 inserted into the second pin fitting hole 12b, the circular saw 5 with a miter angle of 0° is lowered apart from the fence 2 with a predetermined small distance (lmin), so that the center of the circular saw 5 is substantially coincident with the center of the width of the workpiece W2, placed on the base 1, having a predetermined small width and a predetermined maximum thickness. In the concrete, in the disclosure of this embodiment, as shown in FIG. 5, in the case of a circular saw having a diameter of 10 inches, it is expected that a workpiece W2 having a vertical sectional dimension of 3.5 inches and the width of 112 mm is cut. In this dimensional relationship, when the upper hinge member 42 takes its rear position so that the circular saw 5 can vertically cut the workpiece W2, the circular saw 5 is preset so as to be lowered with the center thereof being apart from the fence 2 by a distance 56 mm. According to such setting, the circular saw 5 has a cutting ability of vertically cutting a workpiece having a cross sectional length of four-by-four (3.5 inches×3.5 inches), and moreover, of vertically cutting a workpiece having a vertical section length of two-by-four (1.5 inches×3.5 inches), all with a miter angle of about 0° to 45°.

The bracket 7 is supported, at its rear end, by the upper end of the upper hinge member 42 by the pivot pin 24 and a nut 25 to be pivotally elevatable, and the bracket 7 is moved upward to a non-cut position of the circular saw 5 by the spring 8 disposed between the bracket 7 and the upper hinge member 42.

Figure 6:
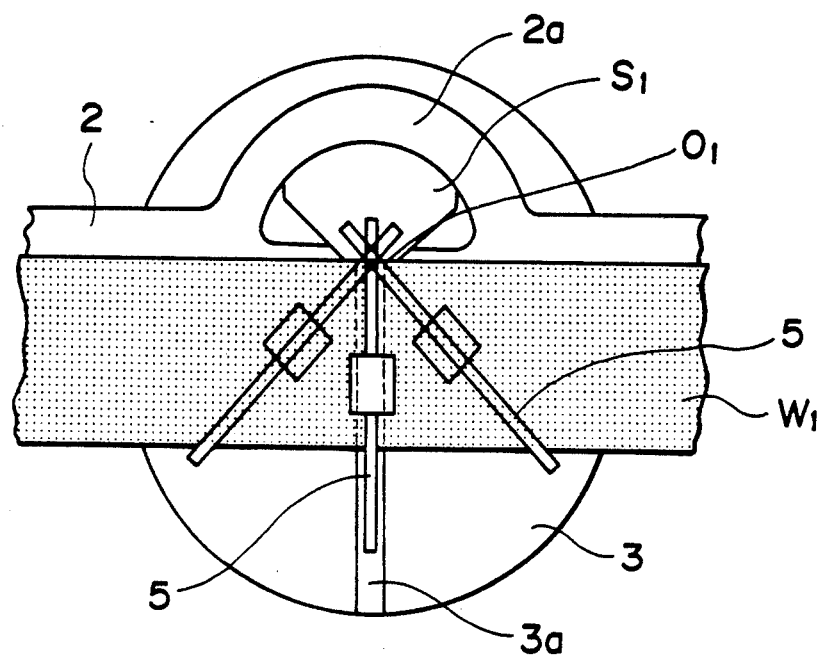
FIGS. 6 and 7 are plan views showing the relationships between the circular saw and a fence at the cutting positions with a miter angle being within 0° to 45° with the upper hinge member being at the front and rear positions, respectively.
Figure 7:
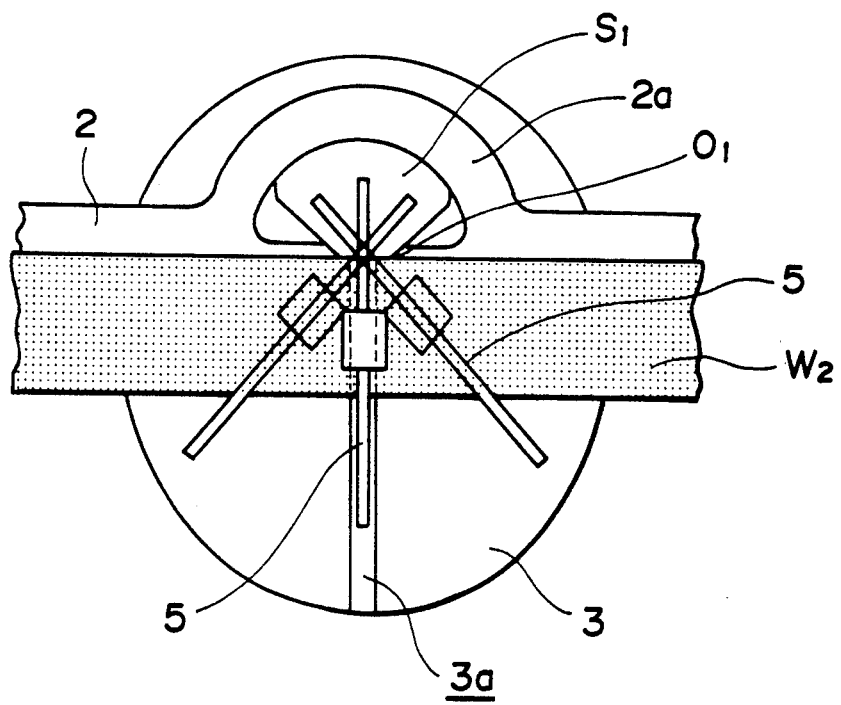

The circular saw 5 is to rotated by a circular saw driving mechanism 6. When the handle 9 is lowered, the circular saw 5 is stopped at a position at which the circular saw 5 enters the circular saw escape slit 3a formed in the rotary table 3 along the back and forth direction through the center of the table 3, at which the circular saw 5 can cut the workpiece mounted on the base 1 (FIGS. 6 and 7).

Figure 29:
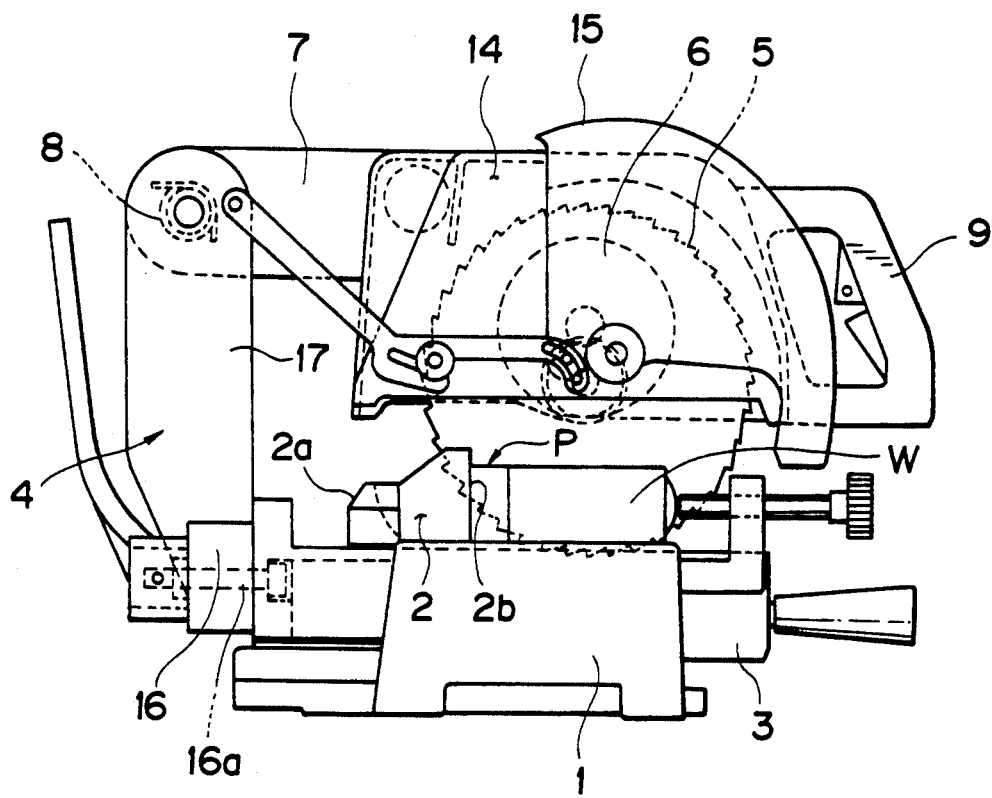
FIG. 29 is a side view of a circular saw unit of conventional type compound miter saw apparatus.
Figure 30:
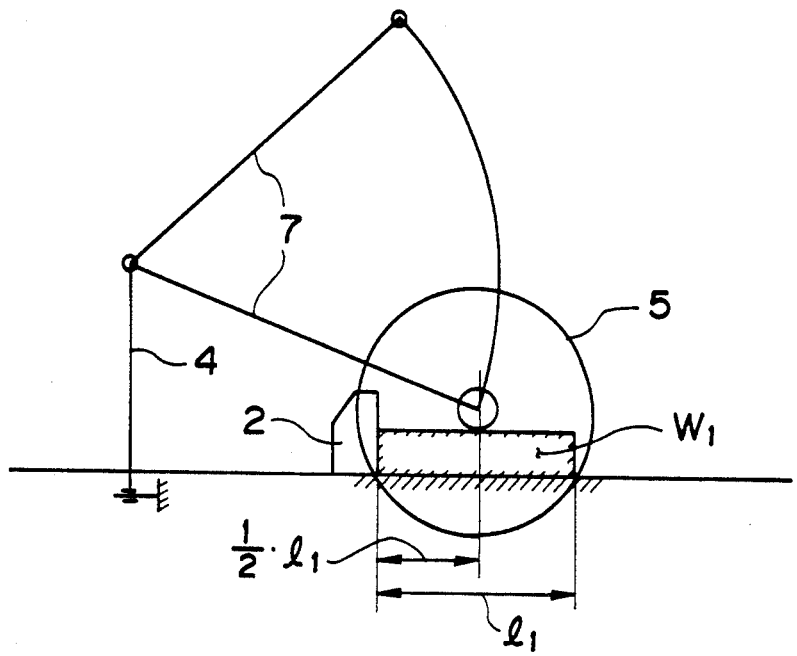
FIGS. 30 and 31 are illustrations showing the cutting conditions of workpieces in use of the circular saw unit of FIG. 29, respectively.
Figure 31:
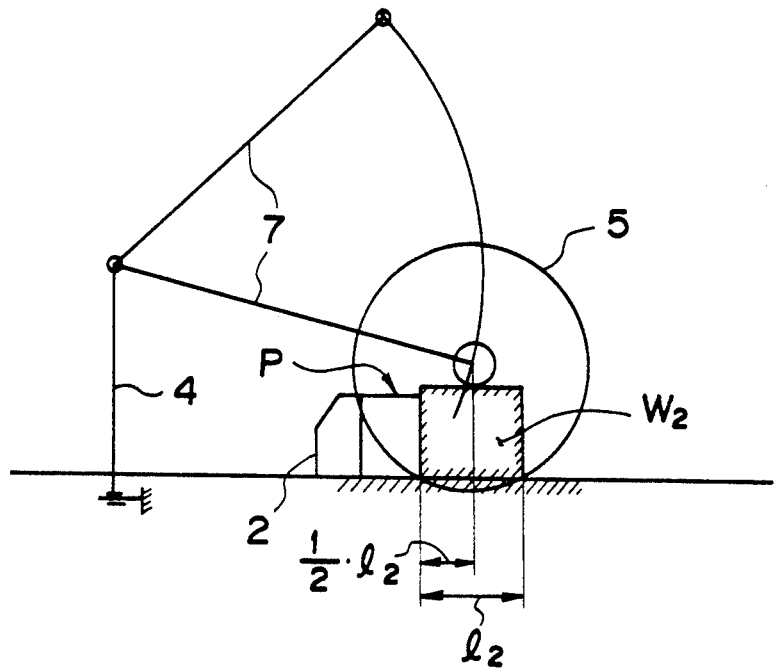
Figure 32:
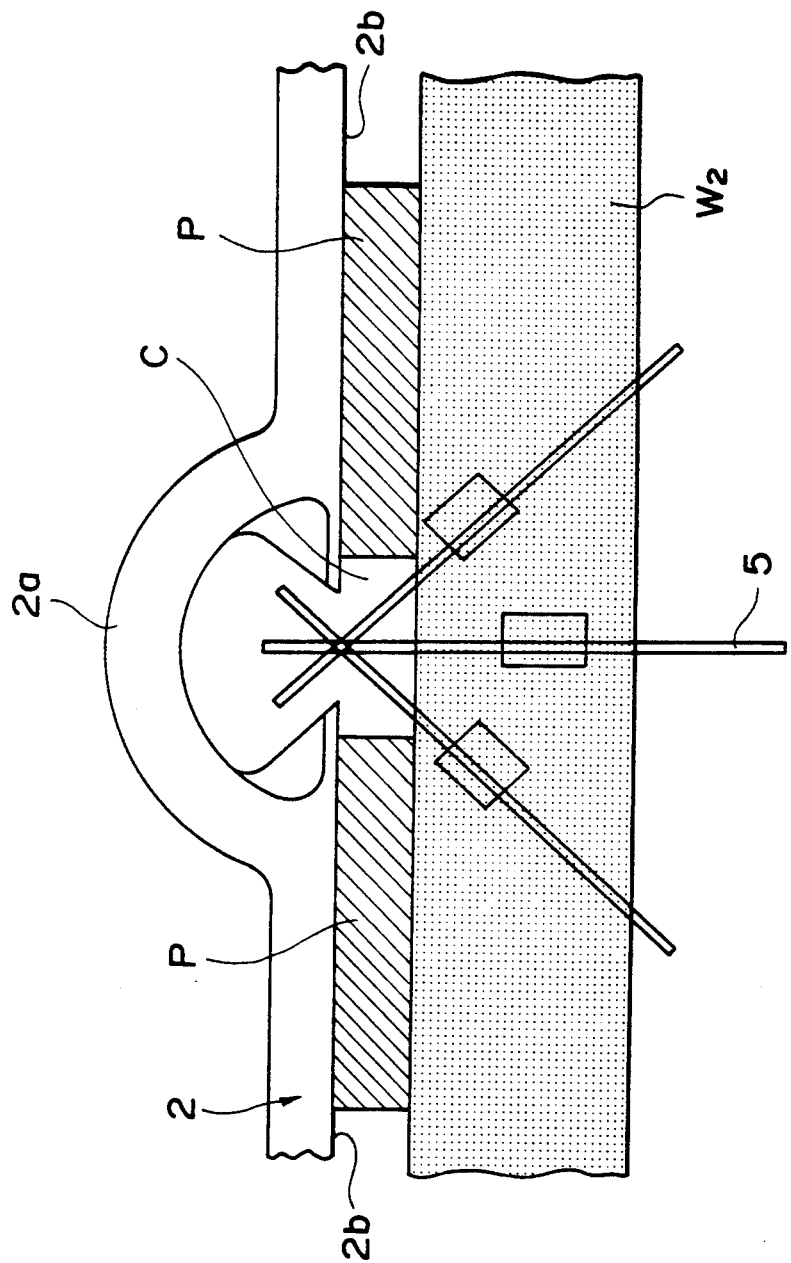
FIG. 32 is a plan view showing the relationship between the circular saw and the fence at the cutting position with the miter angle being within 0° to 45°.

Since each of the workpieces W1, W2 contacts directly the miter fence 2 without the abutment pieces P (FIG. 29), there is not such a space C shown in FIG. 32. Therefore, the scattering of the cut chips is eliminated. However, the front face of the center portion 2a is provided with an opening O1 for accommodating a portion of the circular saw 5 and the opening O1 has a certain length for permitting the circular saw 5 to perform a cutting operation with a miter angle of about 0° to 45° in a state wherein the upper hinge member 42 takes the front position so that a portion of the circular saw 5 is slightly accommodated in a space S1 as shown in FIG. 6. In FIG. 7, the circular saw 5 performs a cutting operation with a miter angle of about 0° to 45° with the upper hinge member 42 being positioned to the rear position. At this time, the portion of the circular saw 5 is accommodated deeply more than that of FIG. 6.

Accordingly, when the workpiece W1 having a desired small thickness and maximum width is cut, the upper hinge member 42 is positioned at its front position and the hinge fastening pin 11 is fitted into the first pin fitting hole 12a. In this state, the workpiece W1 is mounted on the base 1 so as to contact the fence 2. Thereafter, the handle 9 is gripped and lowered, while rotating the circular saw 5, till it enters the circular saw escape slit 3a. When the miter angle of the circular saw 5 is 0°, the circular saw 5 is lowered apart from the fence 2 by the predetermined maximum distance (lmax) so that the center of the circular saw 5 is coincident with the width center of the workpiece W1 placed on the base 1, thus carrying out the cutting operation of the workpiece W1.

On the other hand, when the workpiece W2 having a desired small width and the maximum thickness is cut, the upper end of the link member 42 is positioned at its rear position and the hinge fastening pin 11 is fitted into the second pin fitting hole 12b. In this state, the workpiece W2 is placed on the base 1 so as to contact the fence 2. Thereafter, the handle 9 is gripped and lowered, while rotating the circular saw 5, till it enters the circular saw escape slit 3a. When a miter angle of the circular saw 5 is 0°, the circular saw 5 is lowered apart from the fence 2 by the predetermined small distance (lmin) so that the center of the circular saw 5 is coincident with the width center of the workpiece W2 placed on the base 1, thus carrying out the cutting operation of the workpiece W2.

As described hereinbefore, according to one preferred embodiment of the present invention, the hinge means at the rear end of the rotary table 3 is composed of the two upper and lower hinge members which are pivotably connected to each other. In addition, the upper hinge member 42 takes its front and rear positions so that the circular saw 5 can be lowered with predetermined distances from the fence 2. Accordingly, the lowering position of the circular saw can be adjusted in accordance with the width and the thickness of the workpiece to be cut, thus the cutting area of the lower portion of the circular saw being made wide without locating the abutment pieces as in the conventional art. Moreover, the location of the abutment pieces to the fence 2 can be eliminated and the forward movement of the fence 2 is not required, thus improving the cutting performance and eliminating the troublesome workings as well as the elimination of the scattering of the cut chips in the ambience.

Figure 8:
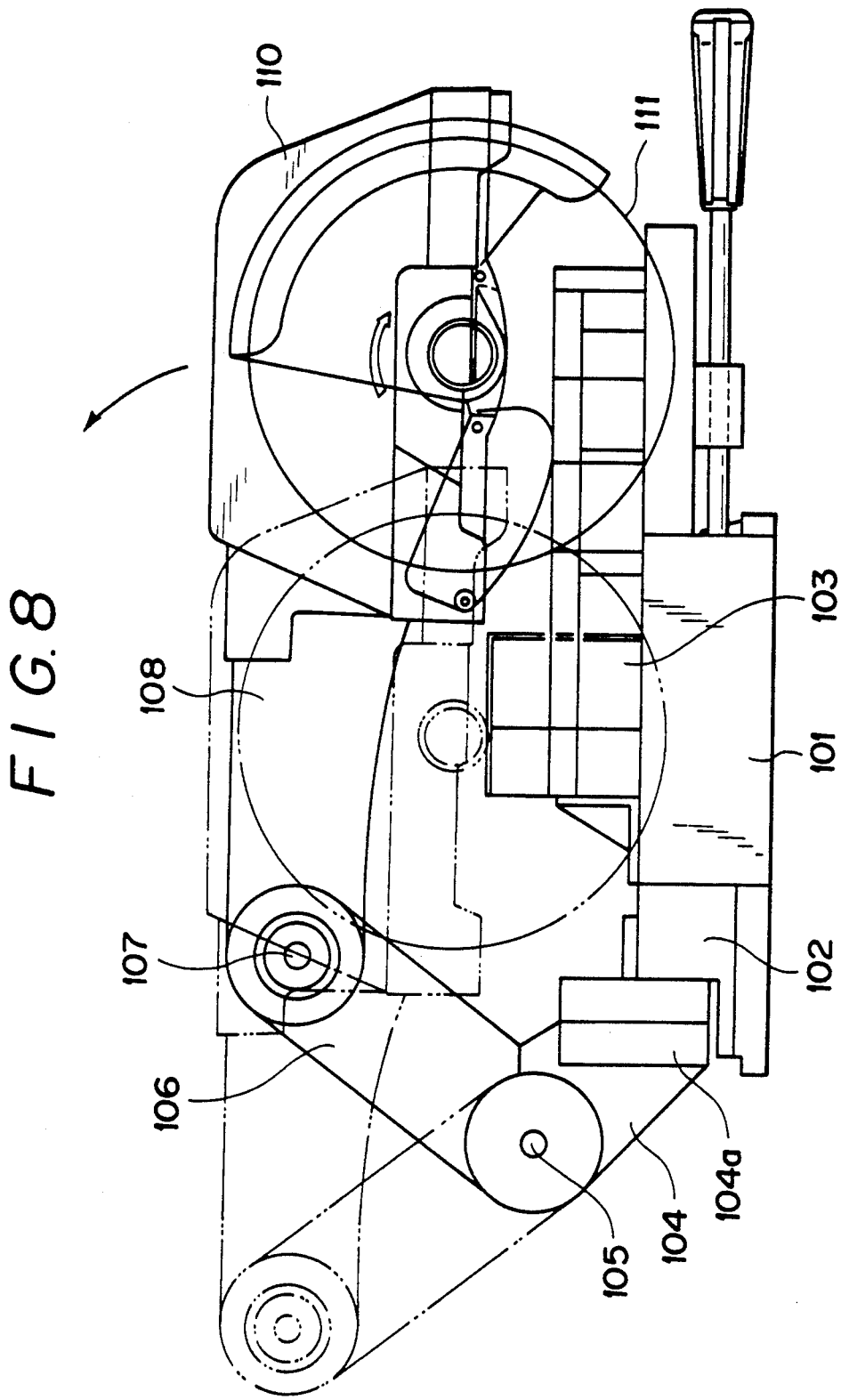
FIG. 8 is a side view of the circular saw unit of another embodiment according to the present invention.

FIG. 8 represents another embodiment of a rotary circular saw unit, similar to that of FIGS. 1 and 2, according to the present invention as an improvement of the former embodiment, in which a circular saw operating portion is constructed to be movable on the base 101.

Namely, referring to FIG. 8, a rotary table 102 is mounted on a base 101 and a workpiece 103 to be cut is placed on the rotary table 102. A lower hinge member 104 is connected pivotably to the lefthand, as viewed in FIG. 8, of the rotary table 102 through a pivot portion 104a. The lower hinge member 104 pivotally supports the lower portion of an upper hinge member 106 through a pivot pin 105. The upper end of the upper hinge member 106 is connected to a bracket 108, as a support arm for supporting swingably the circular saw 111, through an upper pivot pin 107. A cover 110 of the circular saw 103 provided with the circular saw 111 is secured to the bracket 108 and a coil spring, not shown, is interposed between the upper hinge member 106 and the bracket 108 to urge the bracket 108 in the arrowed direction.

In an operation of such rotary circular saw unit, the circular saw 111 is swung with solid lines in FIG. 8 against the urging force of the coil spring, not shown. The circular saw 111 is rotated by a driving motor, not shown. Under this condition, the circular saw 111 is moved leftward, as viewed, thereby cutting the workpiece 103 placed on the rotary table 102.

In the described operation, however, when the circular saw 111 is moved to cut the workpiece 103, the upper hinge member 106 is swung with the pivot pin 107 being the center of the swinging motion and the circular saw 111 is apt to be moved upwardly at an intermediate position in the front and rear direction. Therefore, it is required that an operator has to exert a larger force on a handle provided on the cover 110 at a position in the front and rear movement of the saw during a front and rear movement of the circular saw 111 to maintain the circular saw 111 at a predetermined height level. The working operation is somewhat troublesome and lacks safety.

The following is a further embodiment for substantially improving the above embodiment.

Figure 9:
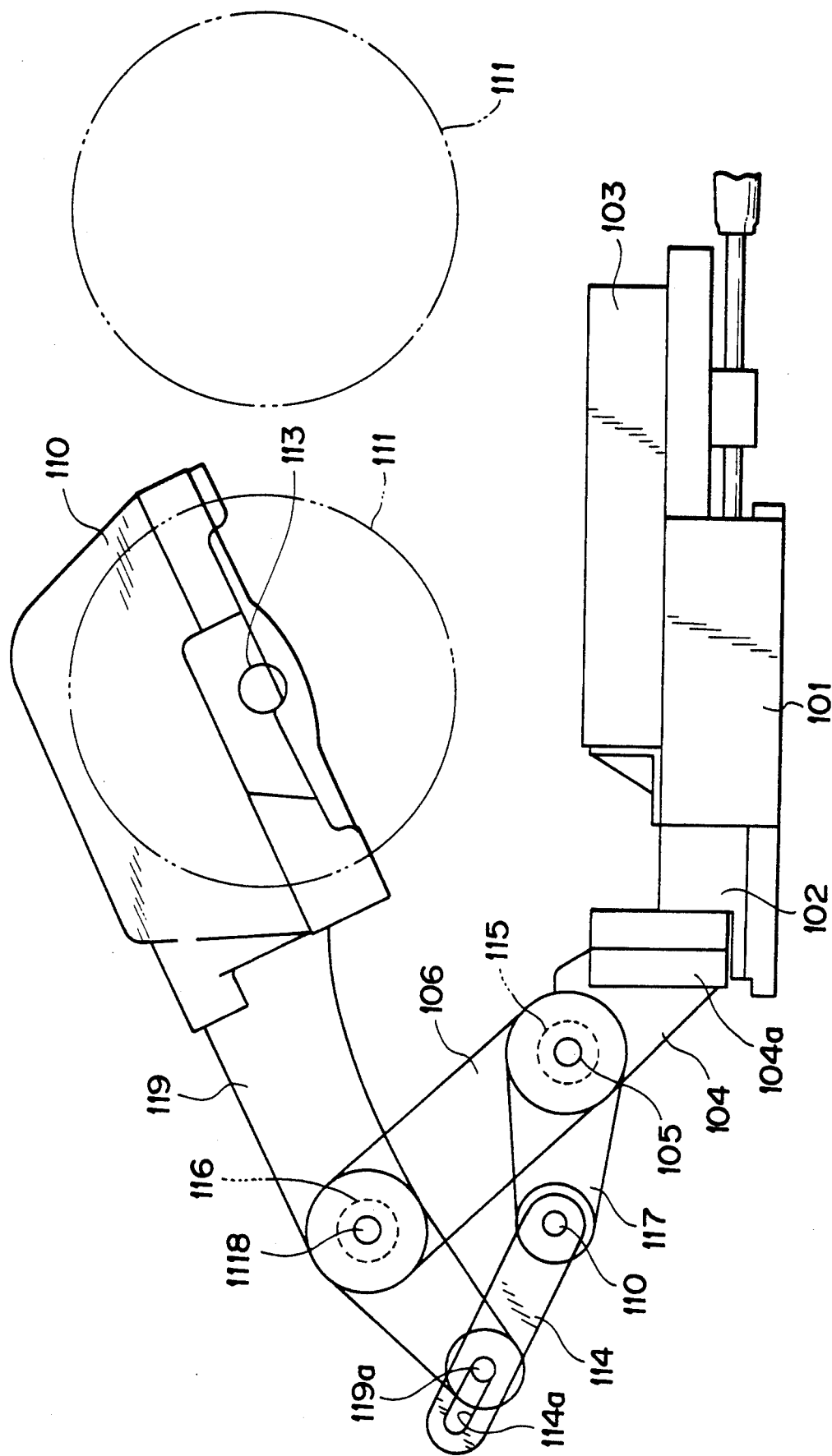
FIGS. 9 to 12 are side views of the circular saw unit of a further embodiment according to the present invention in various cutting operations thereof, respectively.

FIG. 9 shows a side view of a rotary circular saw of a further embodiment of the present invention, in which a rotary table 102 rotatable in a horizontal direction is secured to a base 101 of the circular saw unit and a workpiece 103 to be cut is placed on the rotary table 102. A pivot portion 104a of a lower hinge member 104 is mounted on the base 101 and a workpiece 103 to be cut is secured to the lefthand, as viewed in FIG. 9, of the rotary table 102 and the lower hinge member 104 is integrally formed with the hinge portion 104a. The lower hinge member 104 is connected, at its upper portion, to an upper hinge member 106 through a pivot pin 105. The lower end of the upper hinge member 106 and the right end of a stationary link 117 extending horizontally are also connected to each other through the pivot pin 105. The upper end of the upper hinge member 106 is connected swingably to the center portion of a bracket 119 through a pivot pin 118. A cover 110 for covering a circular saw 103 is secured to the righthand end, as viewed in FIG. 9, of the bracket 119 and the circular saw 103 is attached to the cover 110 through a rotation shaft 113. A driving motor, not shown, is connected to the rotation shaft 113 via a reduction mechanism, not shown.

A swing motion limiting link 114 having a length shorter than that of the upper hinge member 106 is secured to be swingable to the front end of the stationary link 117 extending backwardly horizontally through a pivot pin 110. The swing motion limiting link 114 is provided with an oblong hole (slit) 114a with which a pin 119a disposed at the lefthand end of the bracket 119 is engaged.

A coil spring 115 is provided around the pivot pin 105 to urge the upper hinge member 106 in a clockwise direction with the pivot pin 105 being the center thereof, and a coil spring 116 is also provided around the pivot pin 116 to urge the bracket 119 in a counterclockwise direction.

Namely, according to this embodiment, an irregular quadrilateral, i.e. trapezoidal, link mechanism is formed, and the link mechanism is composed of the upper hinge member 106, the swing motion limiting link 114, the stationary link 117 and the bracket 119 which are mutually swingably connected through the pivot pins 105, 118 and 110 and the pin 119a engaged with the slit 214a formed in the link 114.

The rotary circular saw unit of the structure described above will operate as follows.

Figure 10:
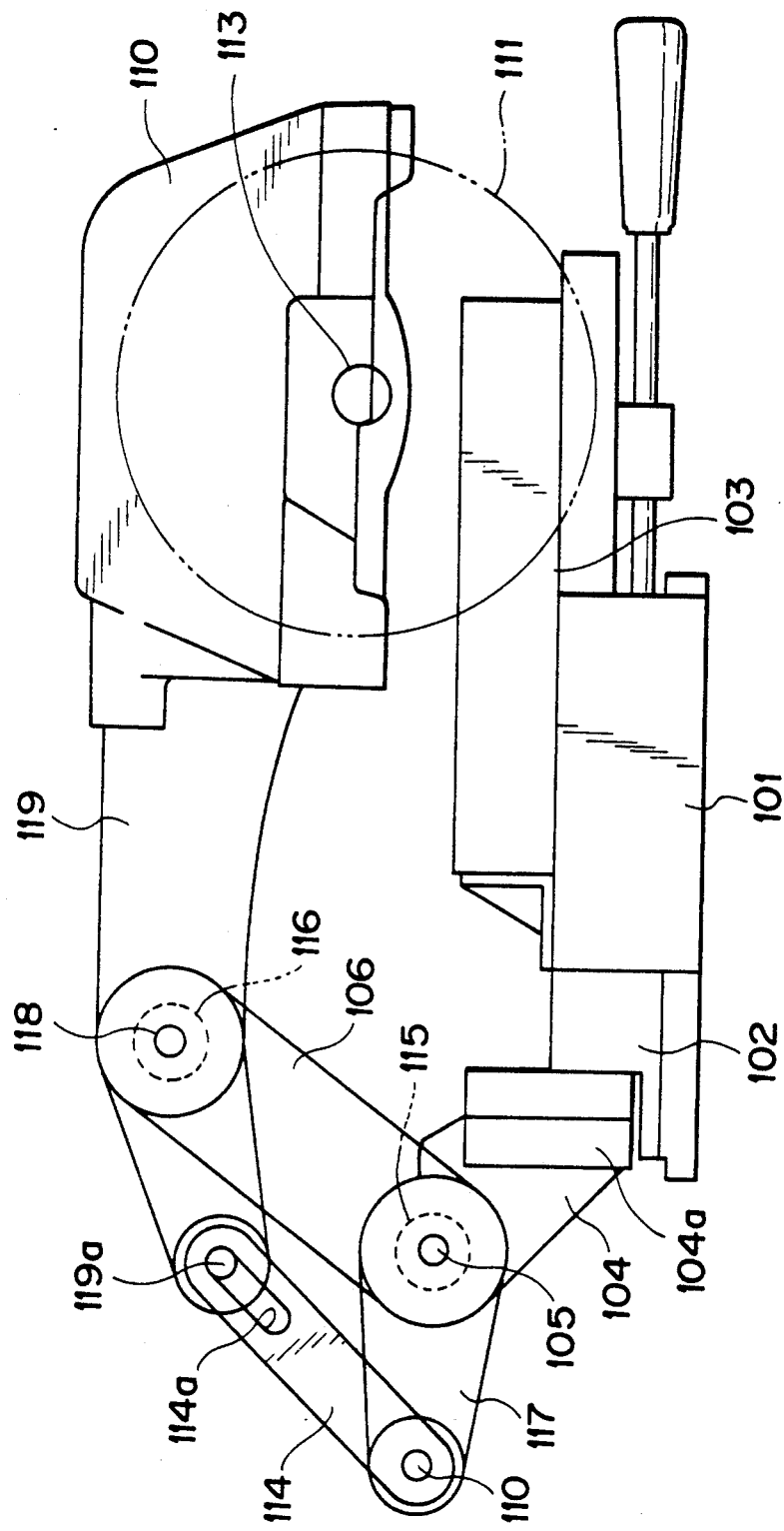

The workpiece 103 is first placed on the rotary table 102, and the rotary table 102 and the lower hinge member 104 are set at the respective predetermined positions. The driving motor is then driven to rotate the circular saw 103. At this time, the circular saw 111 is located at a front position shown by imaginary lines. Next, the bracket 109 is rotated downwardly against the urging force of the coil spring 116 with the pivot pin 118 being the center of the rotation of the bracket 119 (FIG. 10).

The rotation of the bracket 119 is limited, at its one end, by the swing motion limiting link 114, so that the lower limit position thereof is restricted.

Figure 11:
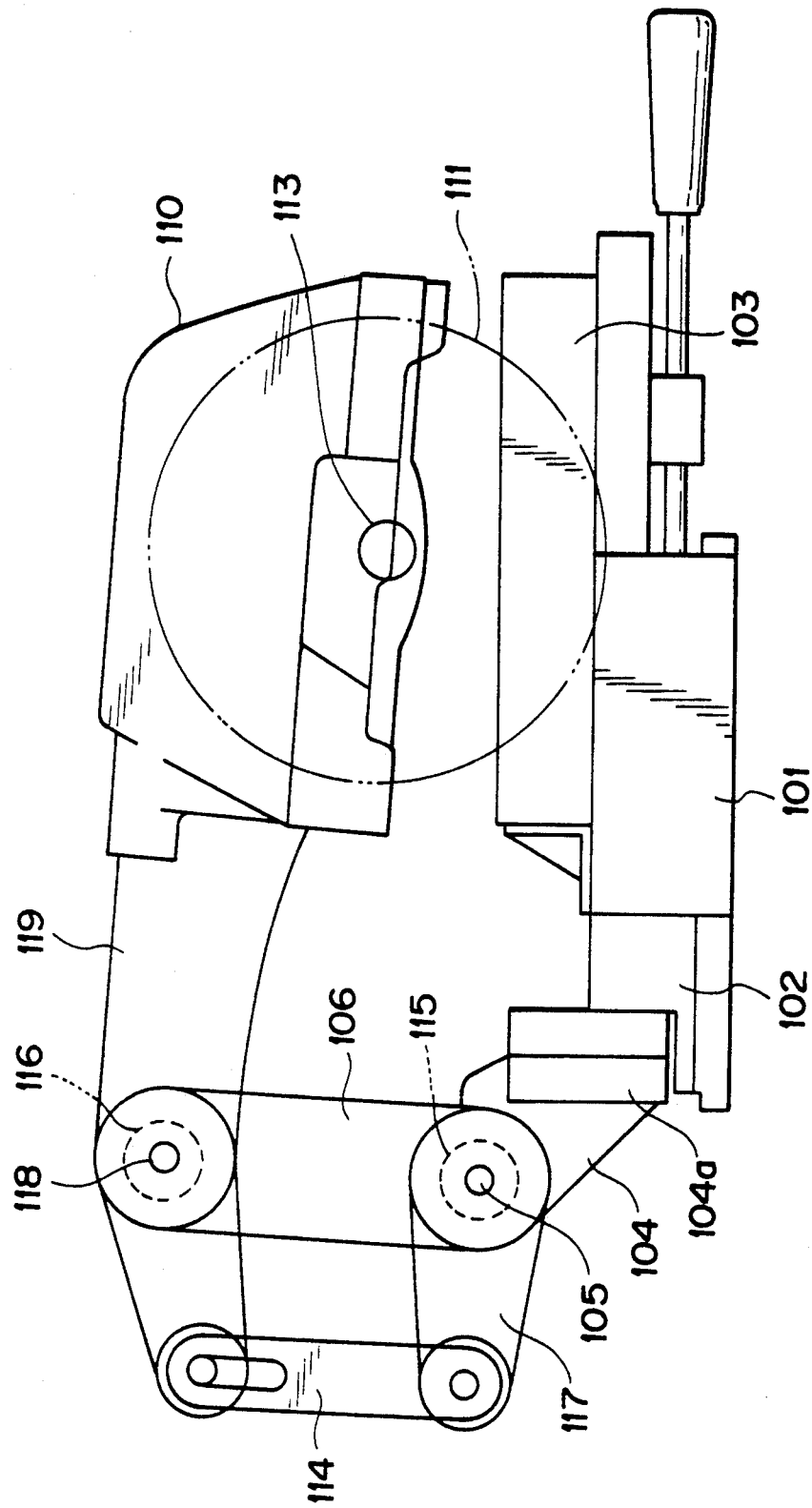
Figure 12:
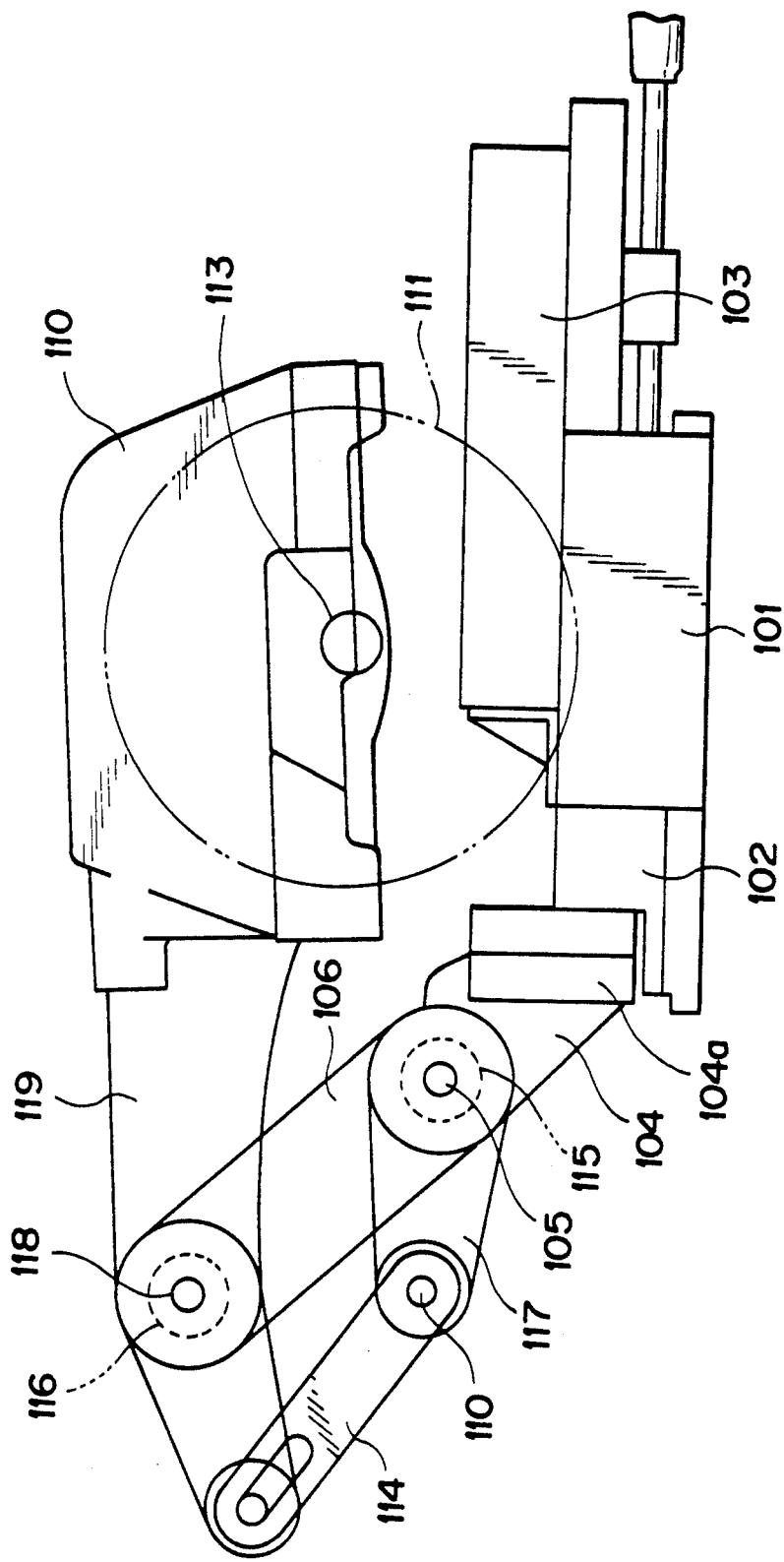

Thereafter, the upper hinge member 106 is rotated by the handle operation of a worker in a counterclockwise direction with the pivot pin 105 being the center of the rotation (FIG. 11). Accordingly, the circular saw 111 is displaced leftwardly as viewed and the cutting operation is carried out to the workpiece 103. In accordance with the movement of the circular saw 111, the irregular quadrilateral link mechanism is also moved. In this movement, the pivot pin 118 moves along an arched locus, but the end portion of the bracket 119 is pivoted to the swing motion limiting link 114 having the length shorter than that of the upper hinge member 106, so that the lowering limit position of the circular saw 111 may be maintained. In addition, at this time, the circular saw 111 is moved substantially horizontally because of the existence of the quadrilateral link.

After the cutting operation is finished, the bracket 119 is rotated upwardly with the pivot pin 118 being the center of the rotation by the urging force of the coil spring 116 (FIG. 9), and the upper hinge member 106 is rotated in the clockwise direction with the pivot pin 115 by the coil spring 115 being the center of this rotation, whereby the irregular quadrilateral link mechanism returns its initial position as shown by the imaginary lines in FIG. 9.

In a concrete example, supposing that the stationary link 117 has a length of 114 mm, the upper hinge member 106 has a length of 180 mm, the bracket 119 has a length of 120 mm between the pivot pins 119a, 118, and the swing motion limiting link 114 has a length of 150 mm between the pivot pins 119a and 110, the irregular quadrilateral link mechanism can be constituted by the upper hinge member 106, the stationary link 117, the swing motion limiting link 114 and a rear extended portion of the bracket 119. To this link mechanism is operatively connected the rotation shaft 113 of the circular saw 111, and accordingly as shown in FIG. 13 as an illustration, even in an arched locus of the movement of the pivot pin 118 and the pivot pin 119a, the rotation shaft 113 of the circular saw 111 is moved substantially horizontally.

Figure 14:
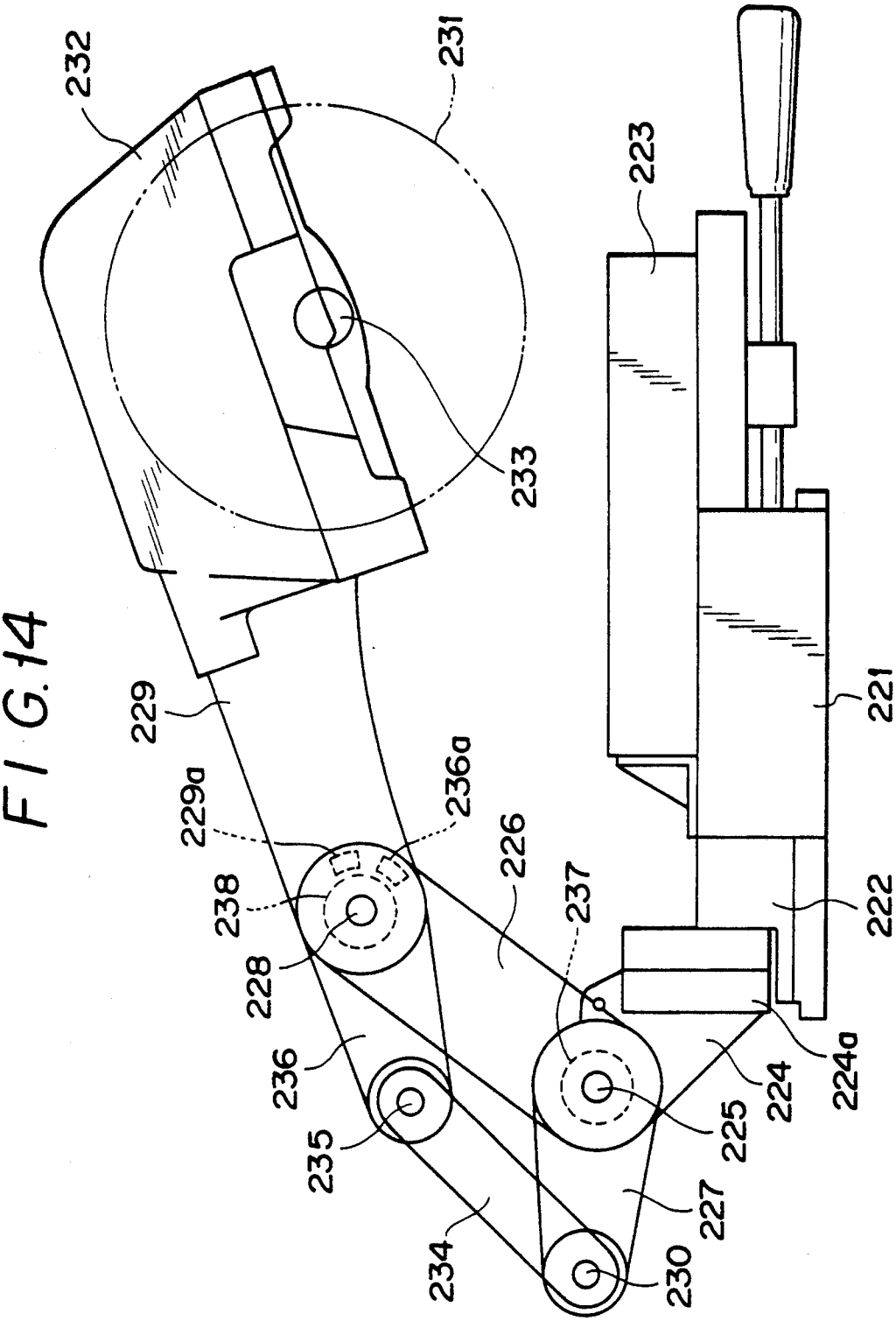
FIGS. 14 to 17 are side views of the circular saw unit of a still further embodiment according to the present invention in various cutting operations thereof, respectively.

FIG. 14 represents a still further embodiment according to the present invention, in which a rotary table 222 rotatable in a horizontal direction is provided on a base 221 of the circular saw unit and a workpiece 223 to be cut is placed on the rotary table 222. A hinge portion 224a is mounted on the base 221 and the workpiece 223 to be worked is secured to the lefthand, as viewed in FIG. 14, of the rotary table 222 and a lower hinge member 224 is integrally formed with the pivot 224a. The lower hinge member 224 supports, at its upper portion, the lower end of an upper hinge member 226 through a pivot pin 225. The right end of the stationary link 227 extending horizontally is also connected to the upper end of the upper hinge member 224. The upper end of the upper hinge member 226 is connected swingably to one end portion of a bracket 229, as a support arm, through a pivot pin 228. A cover 232 for covering a circular saw 231 is secured to the righthand end, as viewed in FIG. 14, of the bracket 229 and the circular saw 231 is disposed on the cover 232 through a rotation shaft 233. A driving motor, not shown, is connected to the rotation shaft 233 via a reduction mechanism, not shown.

A swing motion limiting link 234 having a length shorter than that of the upper hinge member 226 is secured to be swingable to the rear end of the stationary link 227 through a pivot pin 230. A coupling link 236 is disposed to be pivotal between a pivot pin 235 at the one end of the swing motion limiting link 234 and a pivot pin 228 for the upper hinge member 226. The bracket 229 and the coupling link 236 are respectively provided with two projections 229a and 236a both abutting against each other. These projections 229a and 236a, in this meaning, act as a stopper mechanism for limiting the clockwise rotation of the bracket 229 with the pivot pin 228 being the center of this rotation.

A coil spring 237 is provided around the pivot pin 225 for urging the upper hinge member 226 in the clockwise direction with the pivot pin 225 being the center of this clockwise rotation, and a coil spring 238 is further provided around the pivot pin 228 for urging the bracket 229 in the counterclockwise direction with the pivot pin 228 being the center of this motion.

Namely, in this embodiment, an irregular quadrilateral link mechanism is constituted of the upper hinge member 226, the stationary link 227, the swing motion limiting link 234 and the coupling link 236, which are mutually connected through the pivot pins 225, 228, 230, 235.

The rotary circular saw unit of the construction of this embodiment described above will be operated as follows.

Figure 15:
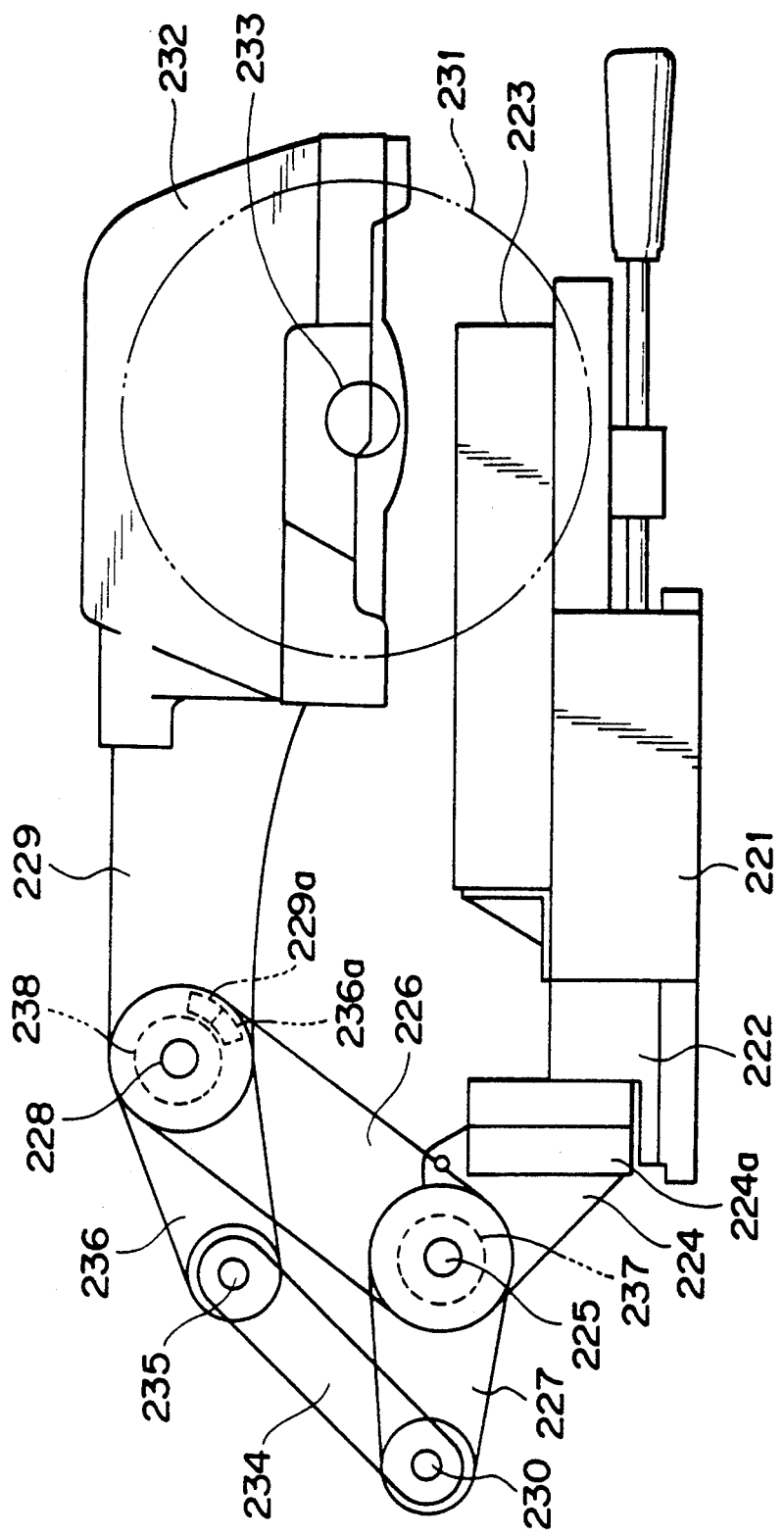

The workpiece 223 is first placed on the rotary table 222 and the rotary table 222 and the hinge portion 224a are set in the respective predetermined positions. The driving motor is then driven to rotate the circular saw 231. Next, the bracket 229 is rotated against the urging force of the coil spring 238 with the pivot pin 228 being the center of the rotation of the bracket 229 (FIG. 15). The rotation of the bracket 229 is limited, at its one end, by the abutment of the projection 229a of the bracket 229 against the projection 236a of the coupling link 236 and the lowering position of the circular saw 231 is determined or restricted.

Figure 16:
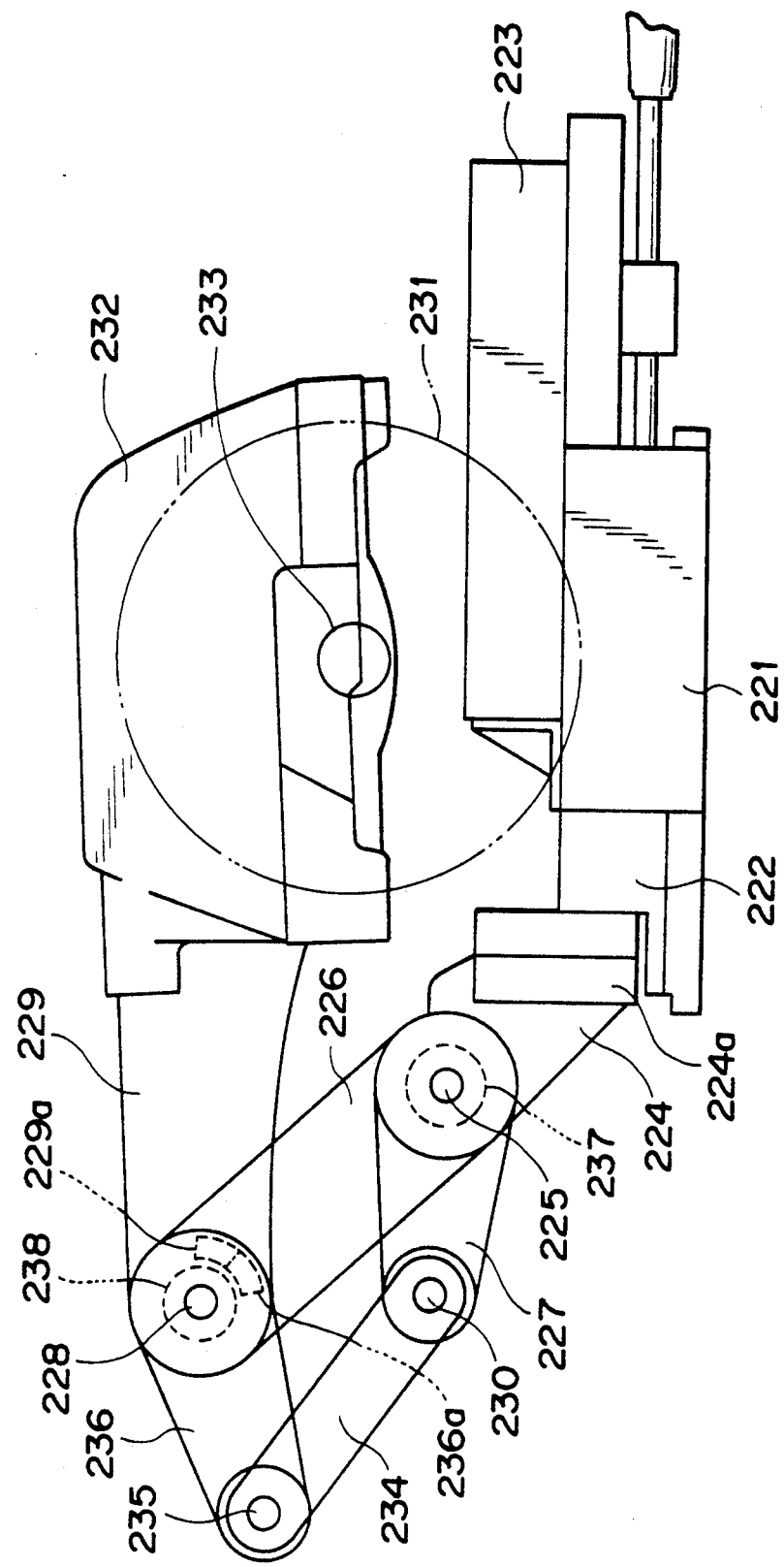

Thereafter, the upper hinge member 226 is rotated by the handle operation of a worker in a counterclockwise direction against the urging force of the coil spring 237 with the pivot pin 225 being the center of the rotation (FIG. 16). Accordingly, the circular saw 231 is displaced leftwardly as viewed and the cutting operation is carried out to the workpiece 223. In accordance with the movement of the circular saw 231, the irregular quadrilateral link mechanism is also moved. In this movement, the projection 229a of the bracket 229 abuts against the projection 236a of the coupling link 236 and the end portion of the coupling link 236 connected to the bracket 229 is pivotally connected to the swing motion limiting link 234 having a length shorter than that of the upper hinge member 226, so that the lowering limit position of the circular saw 231 may be maintained. In addition, since the irregular quadrilateral link mechanism is provided, when the circular saw 231 is moved by operating the bracket 229, the circular saw 231 is moved substantially horizontally (FIG. 16).

According to this embodiment, the lowering limit position of the circular saw 231 is always kept and the further rotation over this lowering limit position can be effectively prevented, thus substantially horizontally displacing the circular saw 231.

After the cutting operation is finished, the bracket 229 is rotated in the counterclockwise direction (FIG. 17) with the pivot pin 228 being the center of the rotation by the urging force of the coil spring 238, and further, due to the urging force of the coil spring 237, the upper hinge member 226 is rotated in the clockwise direction with the pivot pin 225 being the center of this rotation, whereby the irregular quadrilateral link mechanism returns its initial position shown in FIG. 14.

In a concrete example, as referred to the former embodiment, supposing that the stationary link 227 has a length of 114 mm, the upper hinge member 226 has a length of 180 mm, the coupling link 236 has a length of 120 mm and the swing motion limiting link 234 has a length of 150 mm, an irregular quadrilateral link mechanism as shown in FIG. 13 can be constituted by the upper hinge member 226, the stationary link 227, the swing motion limiting link 234 and the coupling link 236.

In this embodiment, the stopper mechanism is constructed by the projections 229a, 236a, but the mechanism may be composed of one protruded member and the other recessed member, both being engageable with each other.

In the foregoing embodiments, the lower hinge member 204 (224) and the stationary link 207 (227) are constructed as separate members, but these members may be constituted integrally.

Figure 18:
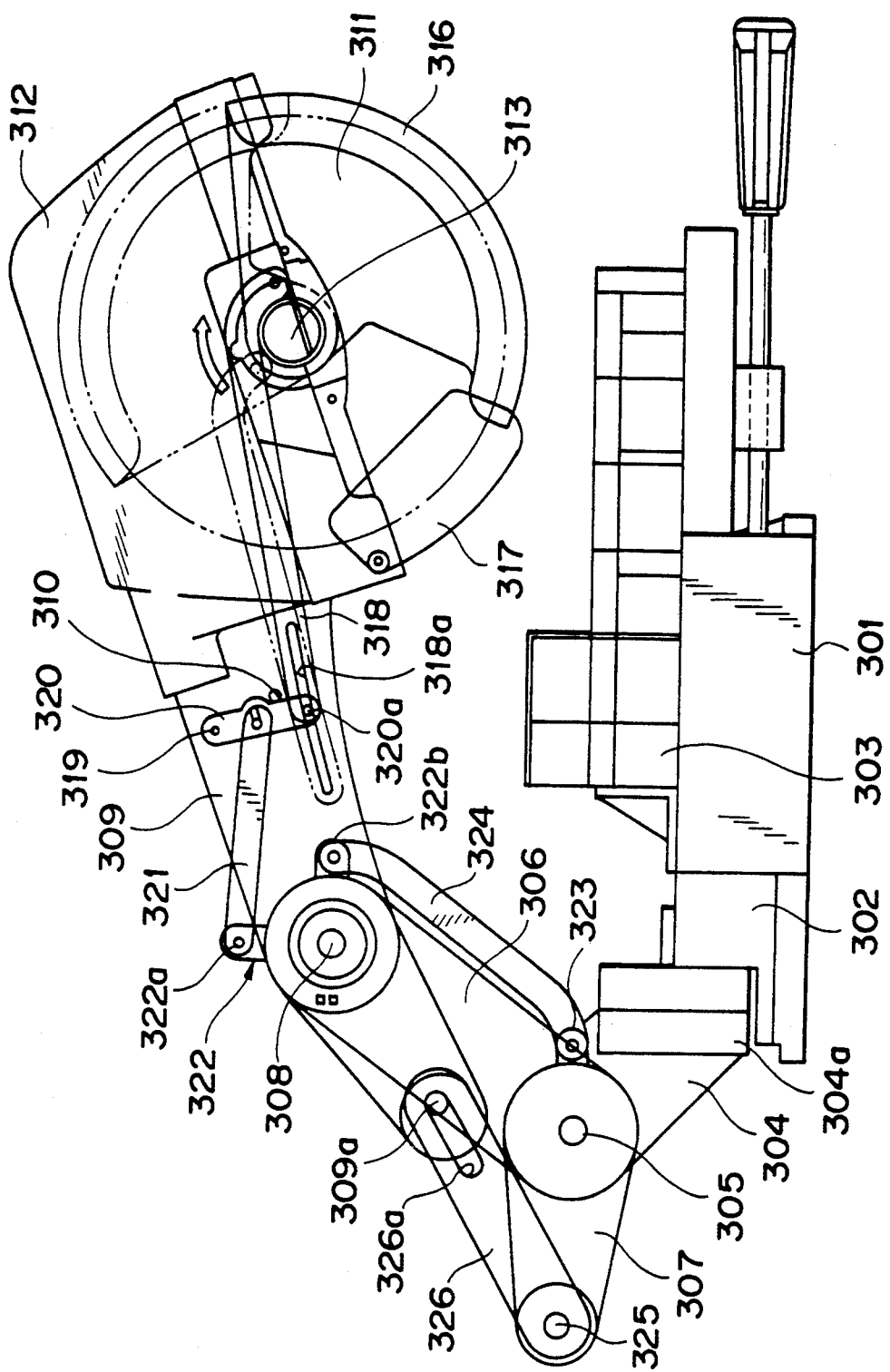
FIG. 18 is a side view of the circular saw unit of a still further embodiment according to the present invention.
Figure 19:
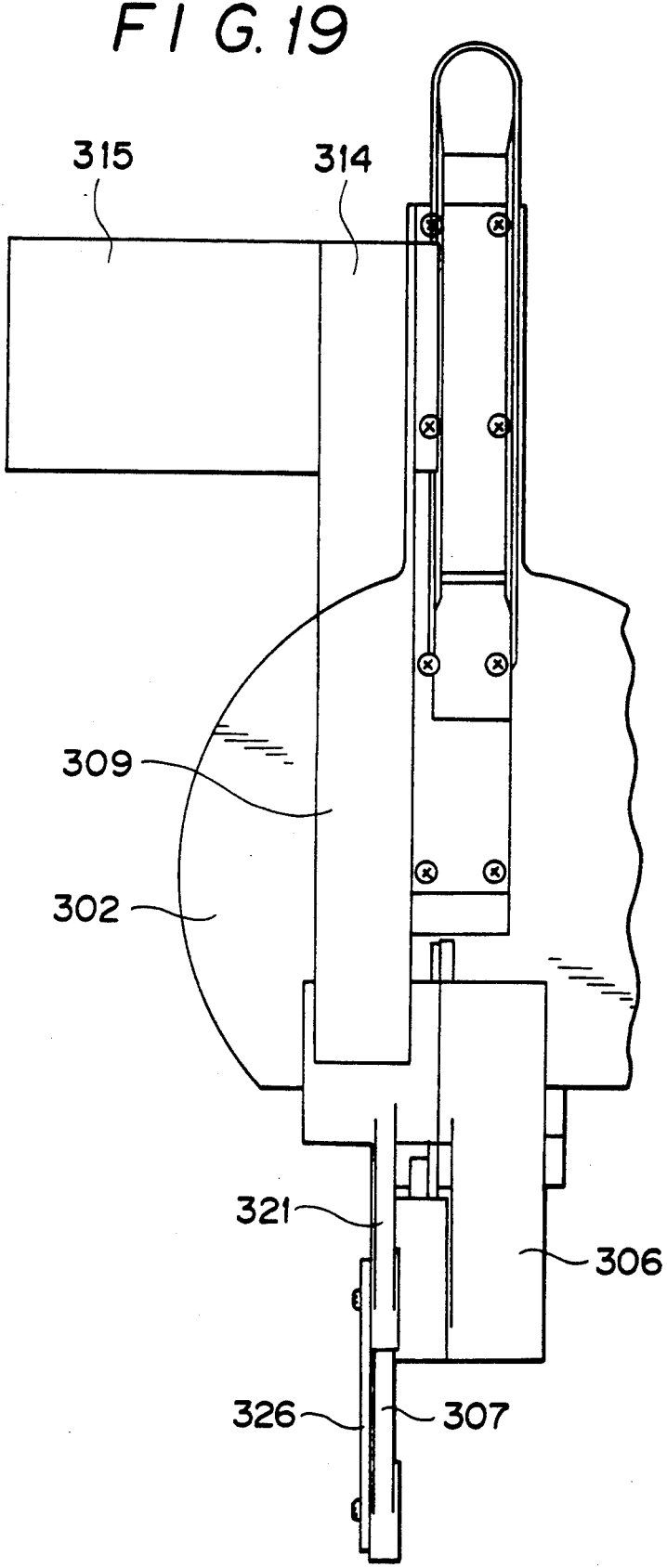
FIG. 19 is a plan view of the circular saw unit of FIG. 18.

FIGS. 18 and 19 represent a still further embodiment according to the prevent invention, in which FIG. 18 is a side view of a rotary circular saw unit of the present embodiment and FIG. 19 is a plan view thereof.

Referring to FIGS. 18 and 19, a rotary table 302 is mounted on a base 301 to be rotatable in a horizontal direction thereof and a workpiece 303 to be cut is placed on the rotary table 302. A pivot 304 is secured to the lefthand, as viewed in FIG. 18, of the rotary table 302 and a lower hinge member 304 is integrally formed with the pivot 304 so as to project upwardly. The support member 304 supports, at its upper portion, an upper hinge member 306 through a pivot pin 305. To the lower hinge member 304 is also connected one end of a stationary link 307, and to other end of the upper hinge member 306 is swingably connected a center portion of a bracket 309, as a support arm, through a pivot pin 308. A cover 312 for covering a circular saw 311 is provided on the righthand, as viewed, of the bracket 309. The circular saw 311 is operatively connected to the cover 312 through a rotation shaft 313, which is in turn connected to a driving motor 315 through a reduction mechanism 314 as shown FIG. 19.

A lower portion of the circular saw 311 projecting over the cover 312 is covered with two guard members 316, 317. The guard members 316, 317 are connected to a projection 322a of an urging force adjusting member 322 (FIGS. 20 or 21) rotatably provided at the pivot pin 308 through a guide drive link 318 provided with a slit 318a and two intermediate links 320 and 321 swingably supported by a fulcrum 319. The urging force adjusting member 322 is also provided with a projection 322b and an auxiliary link 324 is provided between the projection 322b and a hinge member 323 of the lower hinge member 304. The auxiliary link 324 is disposed in parallel to the upper hinge member 306, and accordingly, the upper hinge member 306 and the auxiliary link 324 constitute a parallel link mechanism. A stopper member 310 is located at a proper portion of the bracket 309 to limit the counterclockwise rotation of the intermediate link 320 about the fulcrum 319.

A vertical motion limiting link 326 is swingably attached to the rear end portion of the stationary link 327 through a hinge member 325. The vertical motion limiting link 326 is provided with a slit 326a with which the pin 309a provided at the left end side, as viewed, of the bracket 309 is engaged.

Figure 20:
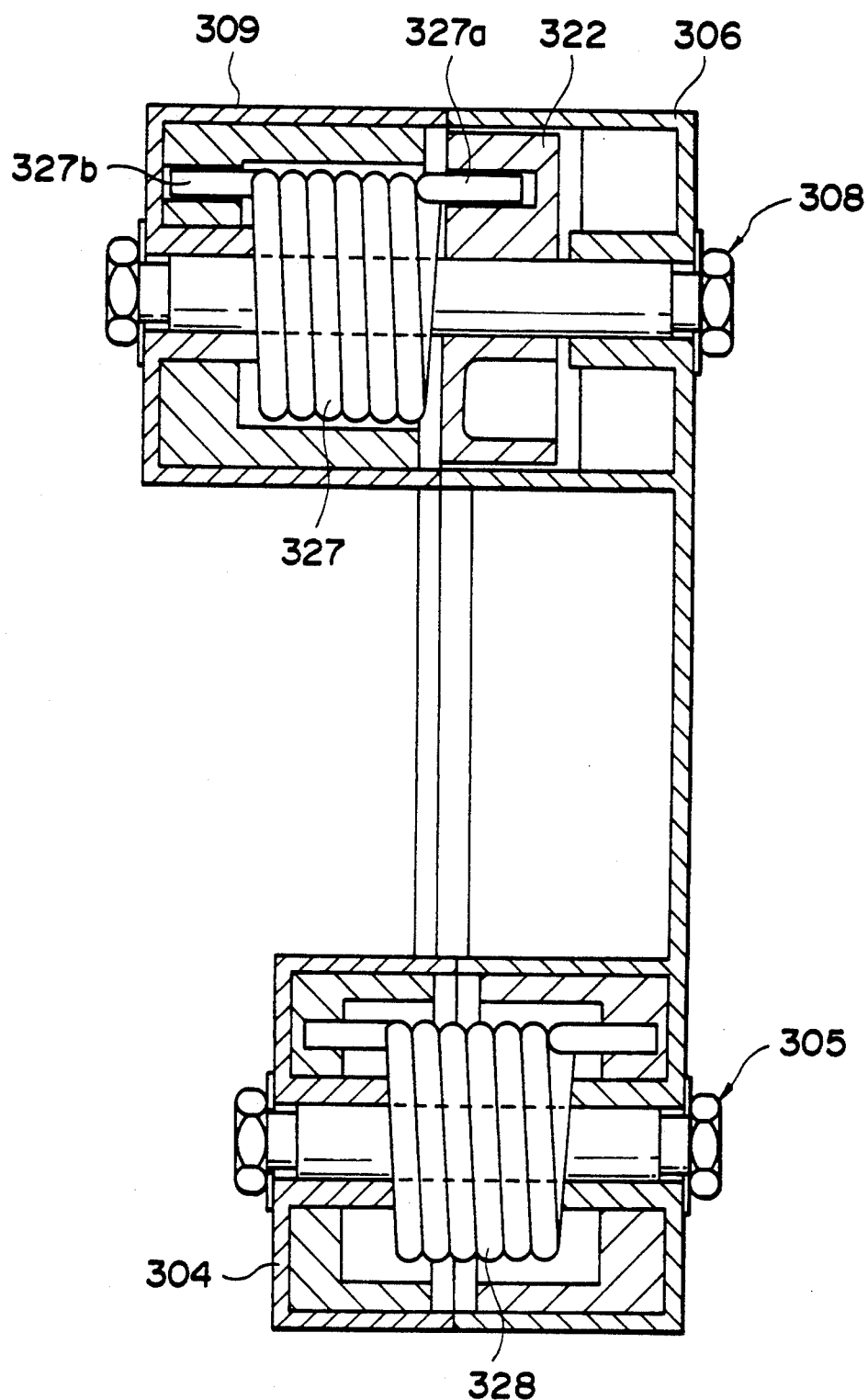
FIG. 20 is a sectional view of a hinge means of the circular saw of FIG. 18.
Figure 21:
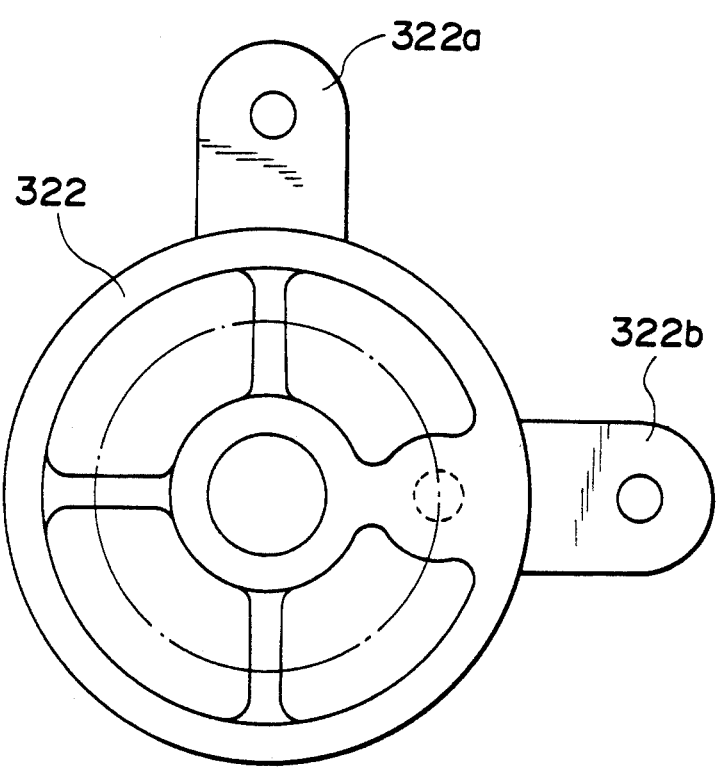
FIG. 21 is a front view of an urging force adjusting member of the circular saw unit of FIG. 18.

FIG. 20 is a sectional view of the upper hinge member 306, in which a coil spring 327 is interposed between the bracket 309 and the urging force adjusting member 322 provided for the upper hinge member 306 in a pivotal manner thereby to urge the bracket 309 in the counterclockwise direction in the state shown in FIG. 18. The coil spring 327 has one end 327a, righthand end as viewed, is fitted in the urging force adjusting member 322 and the other lefthand end 327b is accommodated in the bracket 309. Another coil spring 328 is further disposed between the lower hinge member 304 and the upper hinge member 306 thereby to urge the upper hinge member 306 to be rotatable in the clockwise direction with the pivot pin 305 being the center of this rotation.

The circular saw unit of this embodiment of the structure described above will operate as follows.

Figure 22:
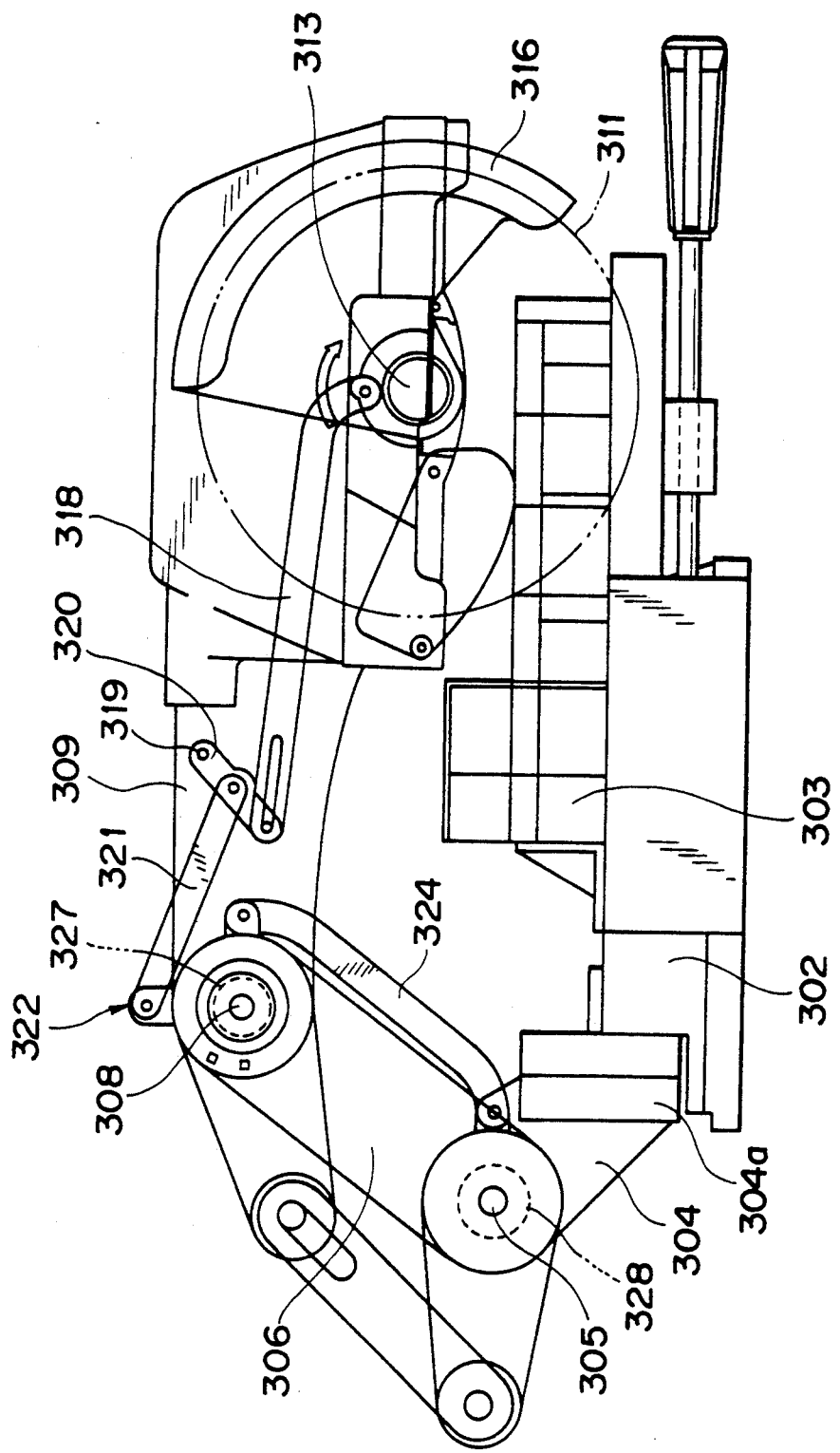
FIGS. 22 to 24 are front views of the circular saw unit of FIG. 18 in various cutting operations thereof, respectively.

First referring to FIG. 18, the workpiece 303 is placed on the rotary table 302, and the rotary table 302 and the hinge portion 304a are set at the respective desired positions. Next, as shown in FIG. 22, the bracket 309 is rotated in the clockwise direction against the urging force of the coil spring 327 with the pivot pin 308 being the center of this rotation. The driving motor 315 is then switched on to rotate the circular saw 311. Then, the cover 312 is moved downwardly to start the cutting operation. Through this operation, the guide drive link 318 is moved leftwardly as viewed in FIG. 22 and the guard members 316, 317 are hence rotated in the counterclockwise direction with the rotation shaft 313 being the center of this rotation, thereby the circular saw blade 311 being exposed outward from the cover 312.

Figure 23:
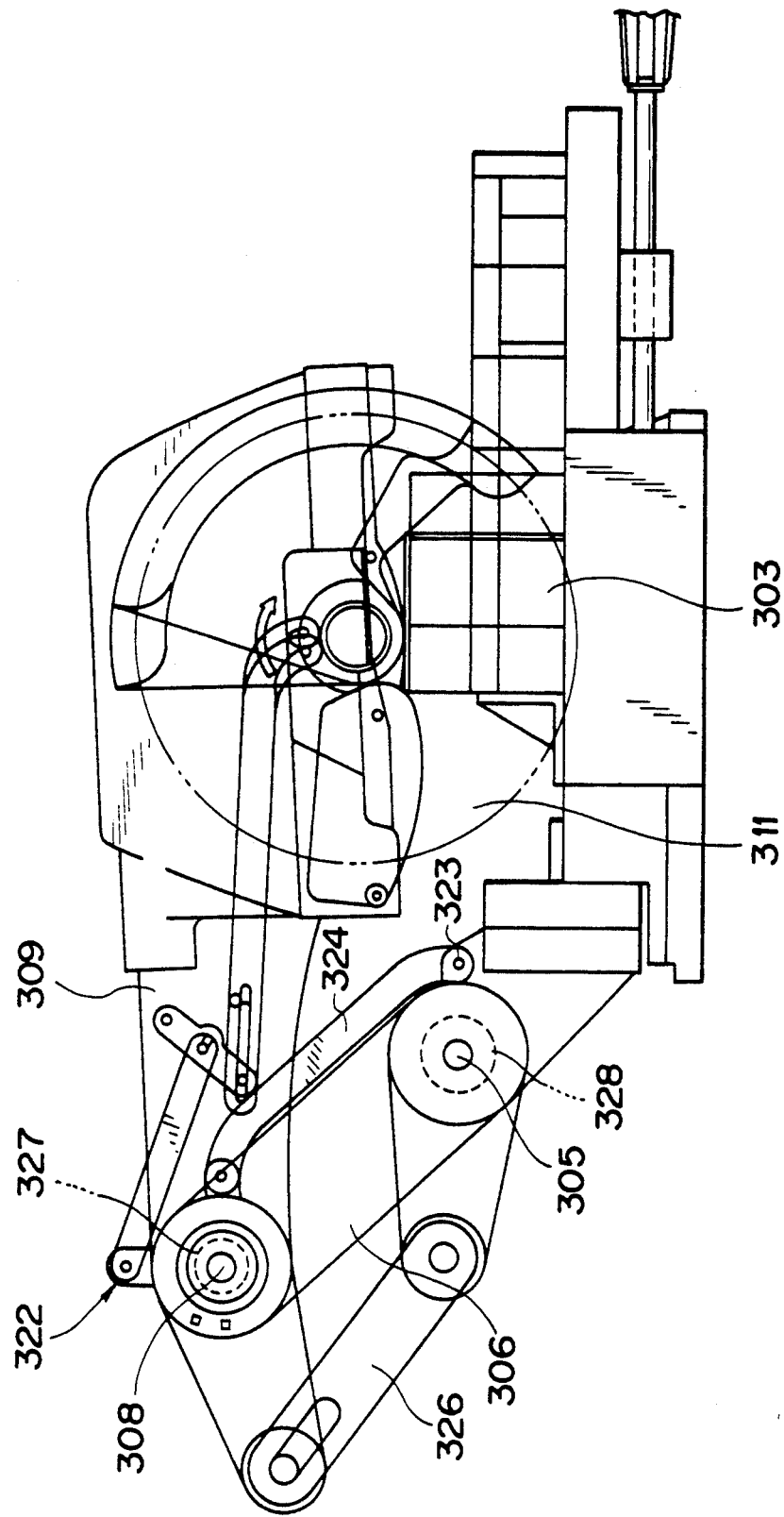
Figure 24:
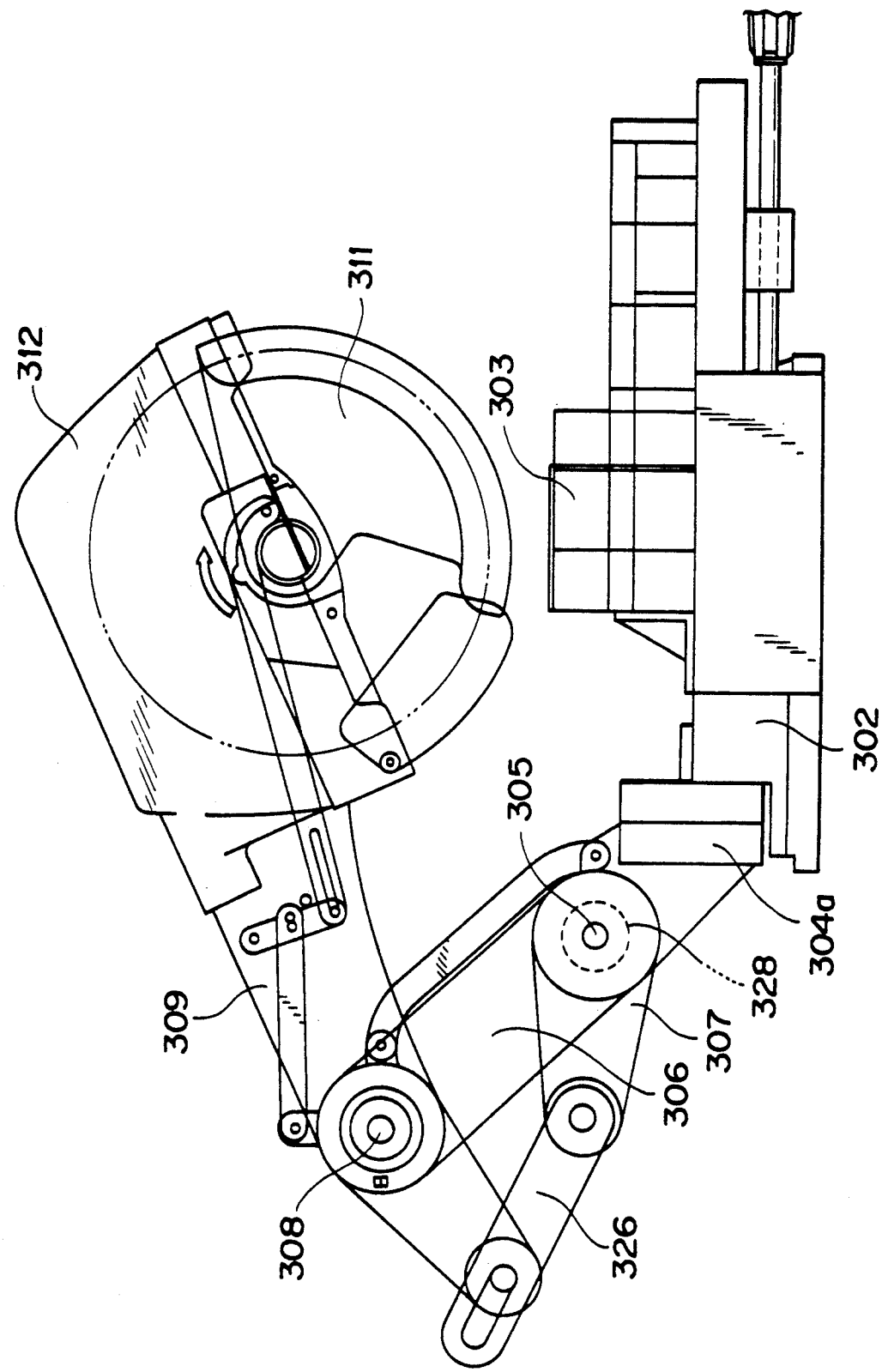

Thereafter, the upper hinge member 306 is rotated in the counterclockwise direction with the pivot pin 305 being the center of this rotation against the urging force of the coil spring 328 with the handle being held by an operator. Then, the circular saw 311 is moved leftward in FIG. 22 to thereby carry out the cutting operation to the workpiece 303 as shown in FIG. 23. During the movement of the circular saw 311, the bracket 309 is rotated in the clockwise direction with respect to the upper hinge member 306. Although, in nature, as the auxiliary link 324 is also rotated in the counterclockwise direction in accordance with the rotation of the upper hinge member 306 with the hinge member 323 being the center of this rotation, and the urging force adjusting member 322 connected to the end portion of the auxiliary link 324 is also rotated in the clockwise direction with the pivot 308 being the center of this rotation. Accordingly, since the coil spring 327 of this embodiment is interposed as shown in FIG. 20 between the urging force adjusting member 322 and the bracket 309, the bracket 309 and the urging force adjusting member 322 are together rotated in the clockwise direction during the leftward movement of the circular saw 311.

Hence, the fixed point of the coil spring 327 for the urging force adjusting member 322 is moved along a circular locus in accordance with the rotation of the bracket 309 and the upper hinge member 306, accordingly, the urging force of the coil spring 327 never change, thus the circular saw 311 being moved under the constant force by the operator. In addition, at the time of the movement of the circular saw 311, the swinging motion of the lefthand end, as viewed, of the bracket 309 is limited by the vertical swing motion limiting link 326, thereby preventing the bracket 309 from being moved downwardly on the side of the circular saw 311, righthand side as viewed.

Thereafter, the bracket 309 is rotated in the counterclockwise direction with the pivot pin 308 being the center of this rotation by the urging force of the coil spring 327 to raise it upwardly. The upper hinge member 306 is then rotated clockwisely by the urging force of the coil spring 328 to take the initial position as shown in FIG. 18. At this time, the auxiliary link 324 rotates the urging force adjusting member 322 in the clockwise direction thereby to move the links 318, 321, resulting in that the guard members 316, 317 are rotated to cover the lower portion of the saw 311 therewith.

Figure 25:
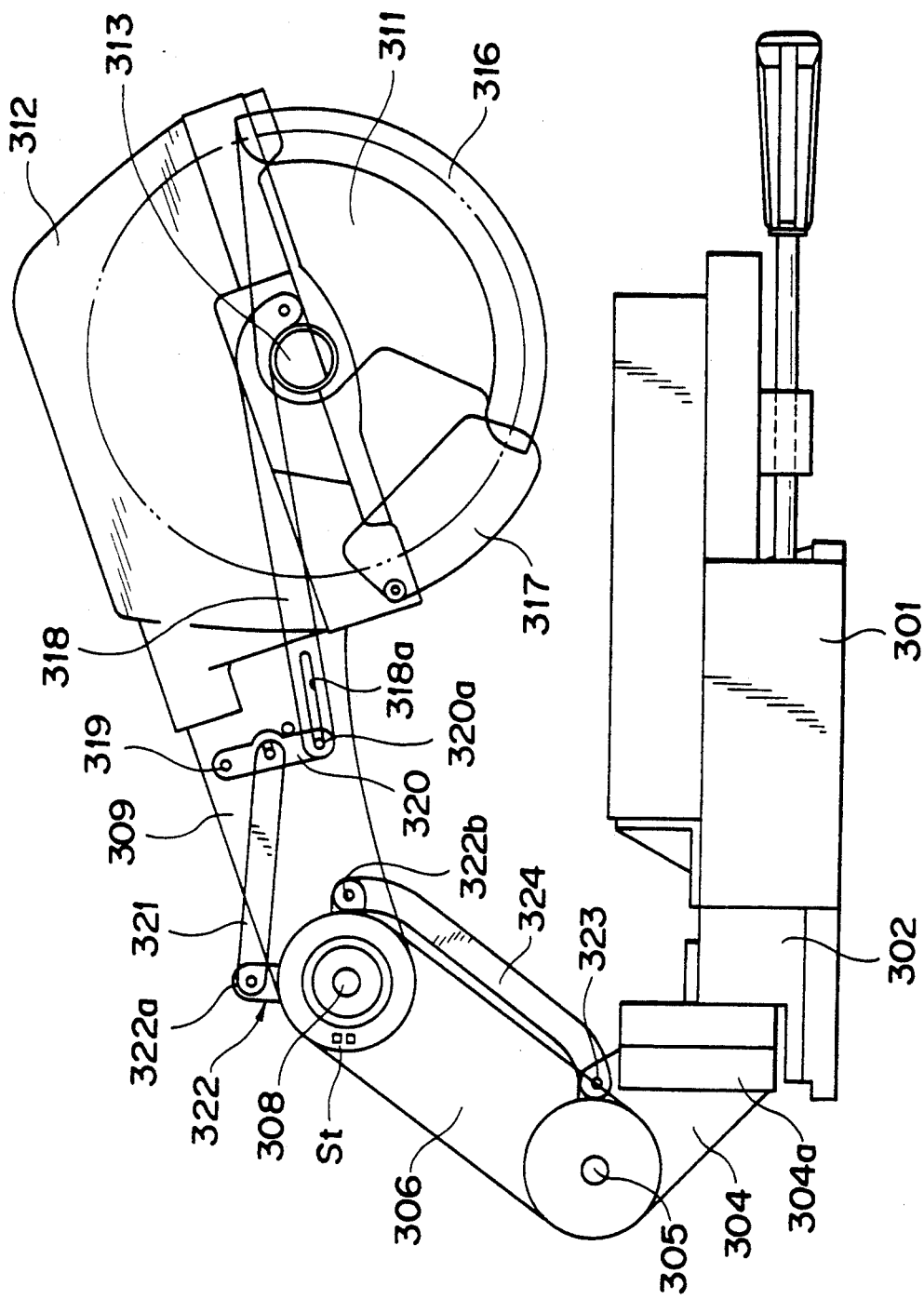
FIG. 25 is a side view of the circular saw unit of a still further embodiment according to the present invention.

FIG. 25 represents a further embodiment according to the present invention in which like reference numerals are added to members or portions corresponding to those shown in FIGS. 18 to 24 and the details thereof are now omitted.

Figure 17:
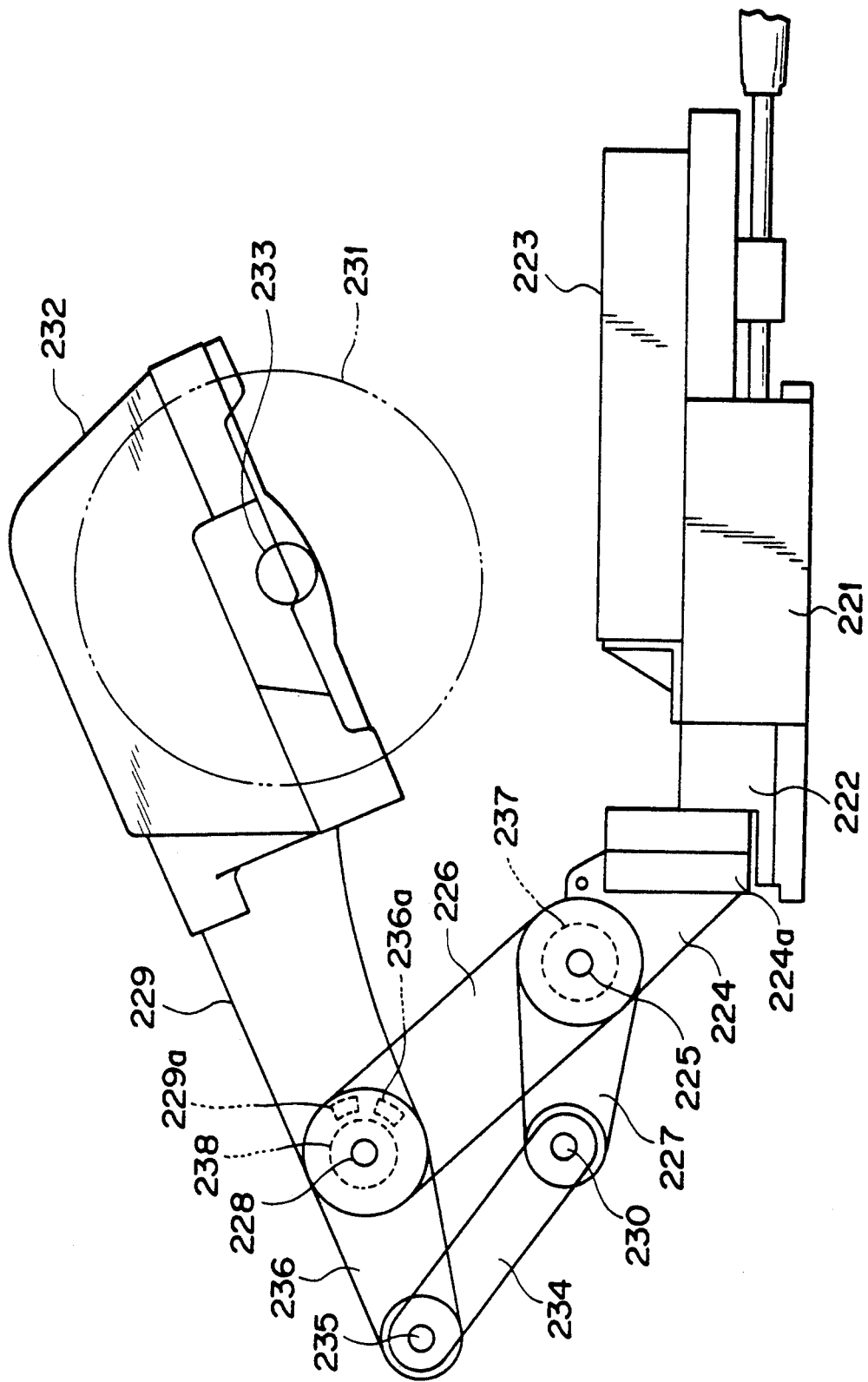

Referring to FIG. 25, the stationary link 307 and the vertical swing motion limiting link 326 shown in FIG. 18 are removed, and a stopper mechanism St such as projections 229a, 236a shown in FIG. 17 is disposed between the urging force adjusting member 322 and the bracket 309 to adjust the lower limit of the swinging motion of the bracket 309.

Figure 26:
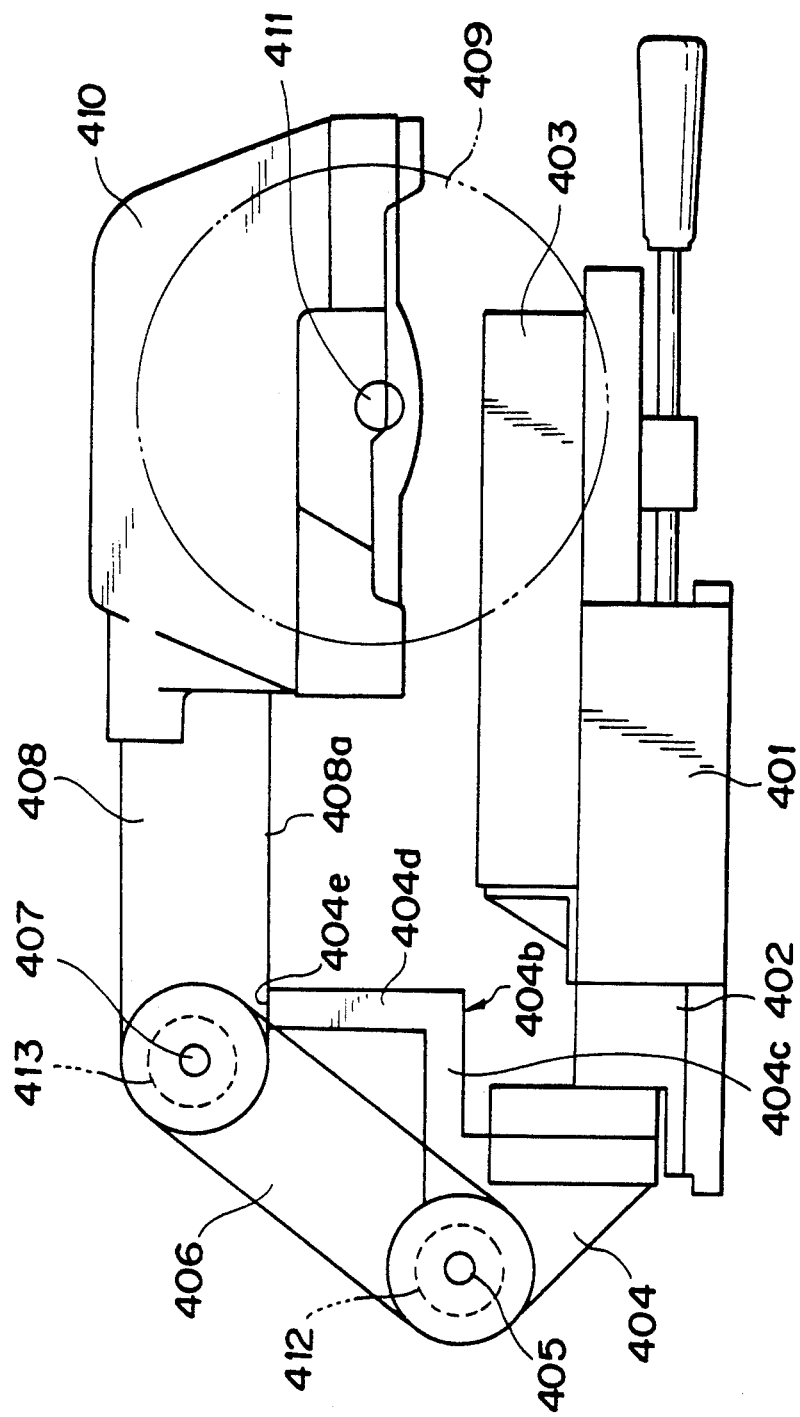
FIGS. 26 to 28 are side views of the circular saw unit of still further three embodiments according to the present invention, respectively.
Figure 27:
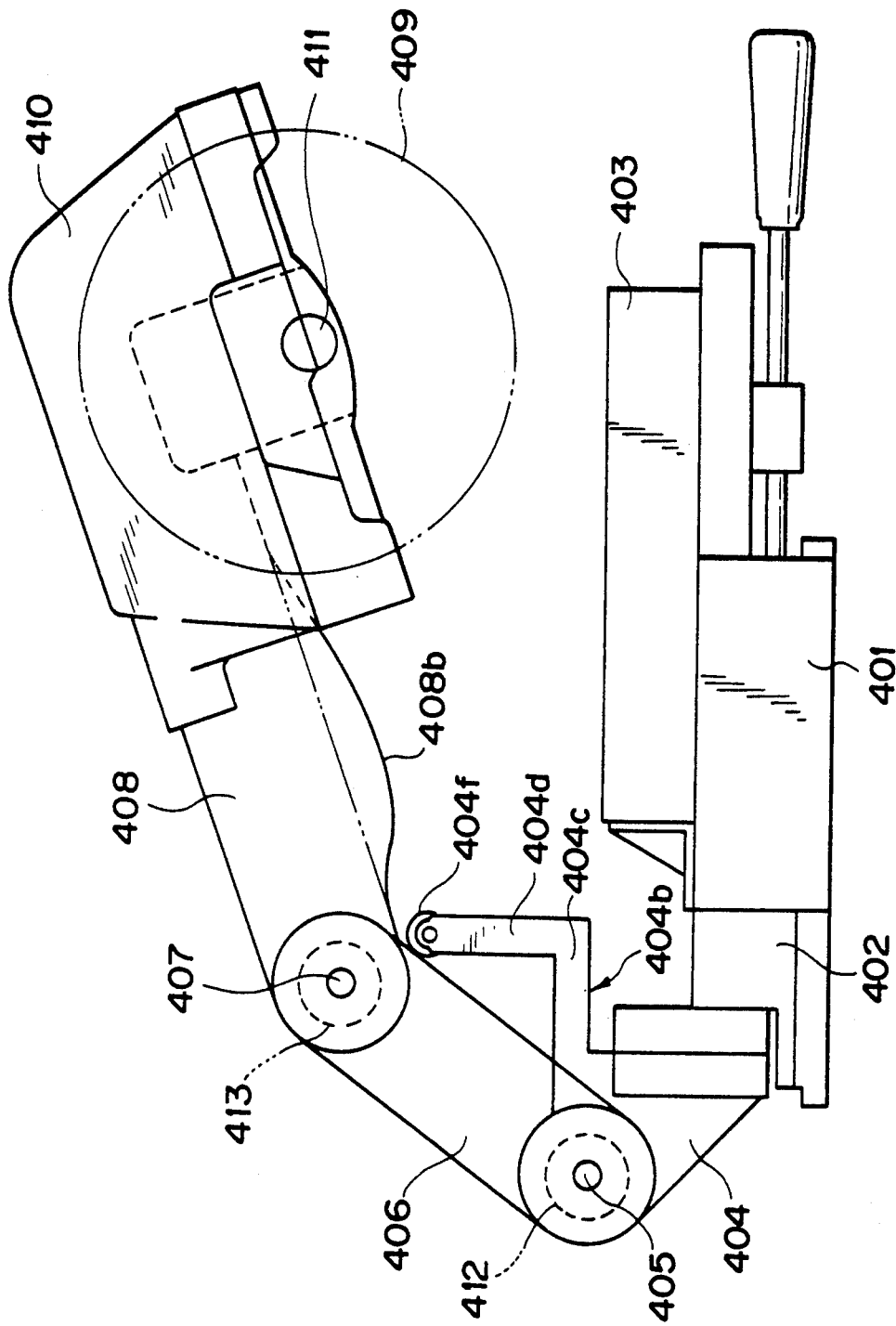
Figure 28:
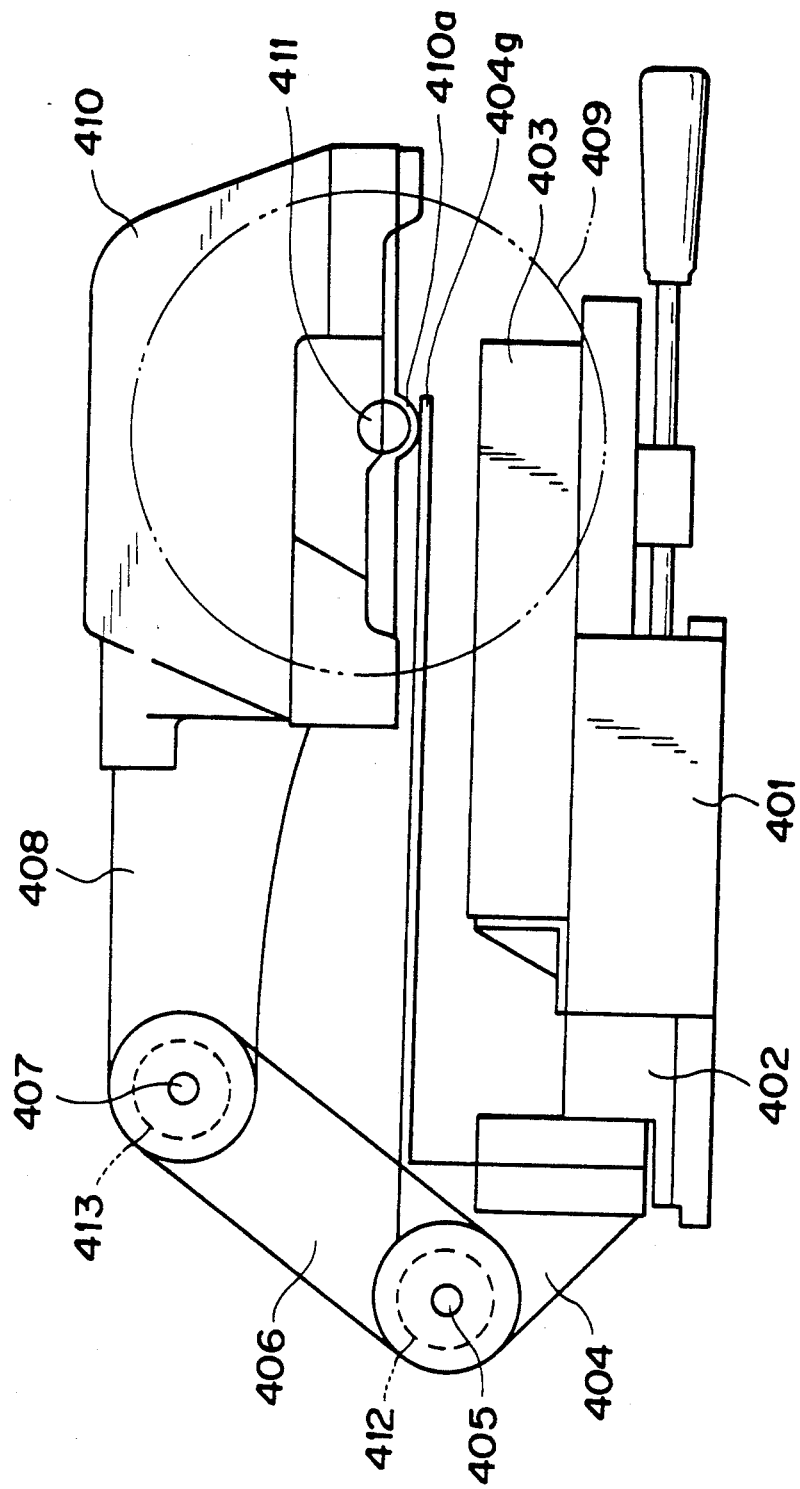

FIGS. 26 to 28 are still further embodiments according to the present invention, respectively.

In FIG. 26, a base 401 and a turntable 402 on which a workpiece 403 is placed are provided. The turntable 402 has, on its side face, a lower hinge member 404 which supports pivotably an upper hinge member 406 through a pivot pin 405 and a coil spring 412. The upper hinge member 406 supports pivotably, on its upper end, a bracket 408 for holding a cover 410 having a support pin 411 for a circular saw 409. The lower hinge member 404 is integrally provided with a guide member 404b which comprises a horizontal portion 404c and a vertical portion 404d having a sliding face 404e at the upper end, thereof. The sliding face 404e slidingly abuts against the lower surface 408a of the bracket 408. The cover 410 is moved in the left direction as viewed in FIG. 26 while the lower face 408a slides on the sliding face 404e during a cutting operation. At this time, the lower limit position of the circular saw 409 is restricted by the guide member 404b.

In FIG. 27, the guide member 404b has, at its upper end, a roller 404f, as a cam follower, which cooperates a cam surface 408b provided on the lower surface of the bracket 408. The cam surface 408b is formed in such a manner that the circular saw 409 is moved substantially horizontally in the front and rear direction during a cutting operation.

Furthermore, in FIG. 28, the lower hinge member 404 is provided with a horizontal guide member 404g which is extended horizontally over the turntable 402 and whose front end slidingly supports a center portion 410a of the cover 410 thereby to keep a horizontal movement of the circular saw 409 during the cutting operation.

It is to be understood that the present invention is not limited to the described preferred embodiments and other changes and modifications may be made within scope of the appended claims.

What is claimed is:

1. A circular saw unit including a circular saw for cutting a work piece, comprising:
   a base member;
   a rotary table which is rotatably mounted on the base member and on which the work piece is placed;
   a hinge supported by the base member; and
   a bracket member pivotably connected to the hinge to support a circular saw; said hinge comprising a first hinge member having a first end pivotably supported by the base member so as to be swingable in lateral directions about a horizontal axis parallel to the rotary table and a second hinge member having a first end pivotably connected to a second end of the first hinge member so as to be swingable in front and rear directions of the rotary table, a second end of the second hinge member pivotably connected to the bracket member, and a hinge locking portion comprising said second end of said first hinge member, said first end of said second hinge member, and a hinge locking means for releasably and selectively locking said second hinge member to said first hinge member so as to maintain said second hinge member in one of a plurality of predetermined rotational positions with respect to said first hinge member when the hinge locking means is locked, and to permit said second hinge member to rotate freely with respect to said first hinge member when said hinge locking means is released.

2. A circular saw unit according to claim 1, wherein said first end of said first hinge member is supported by said rotary table by means of a bolt and nut assembly.

3. A circular saw unit according to claim 1, wherein said second end of said first hinge member and said first end of said second hinge member are pivotably connected by a pivot member to each other.

4. A circular saw unit according to claim 1, wherein said hinge locking means comprises a hinge fastening member movably held in one of said first hinge member and second hinge member and selectively inserted into one of a plurality of pin fitting holes formed in the other of said first hinge member and said second hinge member.

5. A circular saw unit including a circular saw for cutting a work piece, comprising:
   a base member;
   a rotary table which is rotatably mounted on the base member and on which the work piece is placed;
   a hinge supported by the base member; and
   a bracket member pivotably connected to the hinge; said hinge comprising a first hinge member supported by the base member, a second hinge member having a first end pivotably connected to an upper end of said first hinge member so as to be swingable in front and rear directions of the rotary table and a second end pivotably connected to the bracket member, and a hinge locking portion comprising said upper end of said first hinge member, said first end of said second hinge member and a hinge locking means for releasably and selectively locking said second hinge member to said first hinge member at one of a plurality of predetermined rotational positions, such that when said hinge locking means is locked, said second hinge member is maintained in said one of the plurality of predetermined rotational positions, and when said hinge locking means is released, said second hinge member is freely pivotable with respect to said first hinge member.

6. A circular saw unit according to claim 5, wherein said hinge locking means comprises a hinge fastening member movably held in one of said first and second hinge members and selectively inserted into one of a plurality of pin fitting holes formed in the other of said first and second hinge members.

7. A circular saw unit according to claim 6, wherein said hinge further comprises a spring, said spring urging said hinge fastening member toward the pin fitting holes.

8. A circular saw unit according to claim 6, wherein said hinge fastening member has a knob, wherein the hinge fastening member is removed from said one of the plurality of pin fitting holes when said knob is pulled outwardly.

9. A circular saw unit according to claim 5, wherein said hinge further comprises a spring, said spring located at the second end of the second hinge member so as to urge the bracket member upwardly.

* * * * *